US011995800B2

(12) United States Patent
Zhu et al.

(10) Patent No.: US 11,995,800 B2
(45) Date of Patent: May 28, 2024

(54) ARTIFICIAL INTELLIGENCE TECHNIQUES FOR IMAGE ENHANCEMENT

(71) Applicant: Meta Platforms, Inc., Menlo Park, CA (US)

(72) Inventors: Bo Zhu, Charlestown, MA (US); Liying Shen, Charlestown, MA (US); William Scott Lamond, Cambridge, MA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/534,424

(22) Filed: Aug. 7, 2019

(65) Prior Publication Data
US 2020/0051217 A1 Feb. 13, 2020

Related U.S. Application Data

(60) Provisional application No. 62/715,732, filed on Aug. 7, 2018.

(51) Int. Cl.
*G06T 5/00* (2006.01)
*G06F 18/214* (2023.01)
*G06N 3/04* (2023.01)
*G06N 20/00* (2019.01)
*G06T 7/11* (2017.01)
(Continued)

(52) U.S. Cl.
CPC ............ *G06T 5/001* (2013.01); *G06F 18/214* (2023.01); *G06N 3/04* (2013.01); *G06N 20/00* (2019.01); *G06T 5/002* (2013.01); *G06T 7/11* (2017.01); *G06T 7/44* (2017.01); *G06V 10/82* (2022.01);
(Continued)

(58) Field of Classification Search
CPC ... G06T 5/002; G06T 7/11; G06T 7/44; G06T 2207/10016; G06T 2207/20132; G06T 2207/20081; G06T 2207/20084; G06T 5/001; G06K 9/6256; G06N 3/04; G06N 20/00; G06N 3/0445; G06N 20/10;
(Continued)

(56) References Cited

U.S. PATENT DOCUMENTS 7,545,965 B2 * 6/2009 Suzuki ............... G06T 5/007
382/128
10,289,951 B2 5/2019 Wang et al.
(Continued)

FOREIGN PATENT DOCUMENTS

CN 108229526 A 6/2018
CN 112703509 A 4/2021
(Continued)

OTHER PUBLICATIONS

International Search Report and Written Opinion dated Oct. 24, 2019 in connection with International Application No. PCT/US2019/045473.
(Continued)

*Primary Examiner* — Michael S Osinski
(74) *Attorney, Agent, or Firm* — BakerHostetler

(57) ABSTRACT

An image captured by an imaging device in low light conditions may cause the captured image to have poor contrast, blurring, and otherwise not display one or more objects in the image clearly. According to various aspects, systems and methods are provided for enhancing images that are captured in low light conditions.

20 Claims, 14 Drawing Sheets

(51) Int. Cl.
*G06T 7/44* (2017.01)
*G06V 10/30* (2022.01)
*G06V 10/82* (2022.01)

(52) U.S. Cl.
CPC .............. *G06T 2207/10016* (2013.01); *G06T 2207/20132* (2013.01); *G06V 10/30* (2022.01)

(58) Field of Classification Search
CPC ...... G06N 3/0454; G06N 3/084; G06V 10/40; G06V 10/82; G06V 10/30
See application file for complete search history.

(56) References Cited

U.S. PATENT DOCUMENTS

| | | | |
|---|---|---|---|
| 11,182,877 B2 | 11/2021 | Zhu et al. | |
| 2004/0189836 A1* | 9/2004 | Spears | H04N 25/63 348/241 |
| 2005/0174591 A1 | 8/2005 | Sowinski et al. | |
| 2005/0244071 A1 | 11/2005 | Zaharia et al. | |
| 2009/0027523 A1* | 1/2009 | Chang | H04N 9/3194 348/254 |
| 2010/0187401 A1* | 7/2010 | Kawahito | H04N 25/771 257/E27.15 |
| 2010/0265357 A1* | 10/2010 | Liu | G06T 5/50 348/E9.051 |
| 2011/0228096 A1 | 9/2011 | Friel et al. | |
| 2012/0307116 A1 | 12/2012 | Lansel et al. | |
| 2014/0055595 A1* | 2/2014 | Kimura | G02B 21/365 348/80 |
| 2014/0355904 A1 | 12/2014 | Olsson | |
| 2015/0195464 A1* | 7/2015 | Sharma | H04N 23/741 348/217.1 |
| 2015/0229816 A1* | 8/2015 | Tomiyasu | H04N 5/23245 348/207.99 |
| 2016/0028976 A1* | 1/2016 | Ran | H04N 25/63 348/243 |
| 2016/0321523 A1* | 11/2016 | Sen | G06T 15/06 |
| 2017/0032222 A1 | 2/2017 | Sharma et al. | |
| 2017/0109584 A1* | 4/2017 | Yao | G06V 20/47 |
| 2017/0132758 A1 | 5/2017 | Paluri et al. | |
| 2018/0025686 A1* | 1/2018 | Templin | H04N 5/2625 348/367 |
| 2018/0042564 A1* | 2/2018 | Zhou | A61B 6/5235 |
| 2018/0047176 A1* | 2/2018 | Toyoda | G06T 7/337 |
| 2018/0121767 A1* | 5/2018 | Wang | G06T 5/50 |
| 2018/0137605 A1* | 5/2018 | Otsuka | G06T 5/50 |
| 2018/0157899 A1* | 6/2018 | Xu | G06K 9/4628 |
| 2018/0220061 A1 | 8/2018 | Wang et al. | |
| 2018/0286037 A1* | 10/2018 | Zaharchuk | G06T 5/50 |
| 2018/0293710 A1* | 10/2018 | Meyer | G06T 5/002 |
| 2018/0336692 A1* | 11/2018 | Wendel | G06K 9/00825 |
| 2018/0352118 A1* | 12/2018 | Birkbeck | G06T 5/002 |
| 2019/0035431 A1* | 1/2019 | Attorre | G11B 27/036 |
| 2019/0043178 A1 | 2/2019 | Chen et al. | |
| 2019/0080205 A1* | 3/2019 | Kaufhold | G06K 9/6257 |
| 2019/0130208 A1 | 5/2019 | Michael et al. | |
| 2019/0209867 A1* | 7/2019 | Sun | G06K 9/3233 |
| 2019/0333198 A1* | 10/2019 | Wang | G06N 3/0454 |
| 2019/0362522 A1* | 11/2019 | Han | A61B 5/7267 |
| 2020/0050890 A1* | 2/2020 | Aizawa | G06K 9/00697 |
| 2020/0051260 A1 | 2/2020 | Shen et al. | |
| 2020/0068151 A1* | 2/2020 | Pourreza Shahri | H04N 5/2356 |
| 2020/0121256 A1* | 4/2020 | McDuff | G16H 50/20 |
| 2020/0137288 A1* | 4/2020 | Fujikawa | H01L 27/14609 |
| 2020/0228736 A1 | 7/2020 | Mcelvain | |
| 2020/0244842 A1* | 7/2020 | Xiao | G06N 3/08 |
| 2020/0279354 A1* | 9/2020 | Klaiman | G06T 5/005 |
| 2020/0285937 A1* | 9/2020 | Xu | G06Q 30/0224 |
| 2020/0302180 A1* | 9/2020 | Zhang | G06K 9/6217 |
| 2020/0364501 A1* | 11/2020 | Herz | G07G 1/0063 |
| 2020/0401808 A1* | 12/2020 | Wu | G06T 7/246 |
| 2021/0082112 A1* | 3/2021 | Li | G06K 9/00 |
| 2021/0117726 A1* | 4/2021 | Zhang | G06K 9/6215 |
| 2021/0150268 A1* | 5/2021 | Wang | G06N 3/08 |
| 2021/0181287 A1* | 6/2021 | Sommer | G01R 33/56509 |

FOREIGN PATENT DOCUMENTS

| | | |
|---|---|---|
| EP | 3834135 | 6/2021 |
| WO | WO 2018/045274 A1 | 3/2018 |
| WO | 2020033524 A1 | 2/2020 |

OTHER PUBLICATIONS

International Preliminary Report on Patentability for International Application PCT/US2019/045473, Report issued Feb. 9, 2021 dated Feb. 18, 2021 10 Pgs.
Kalukin et al., "Automated generation of convolutional neural network training data using video sources", IEEE publication, Apr. 2017, pp. 1-3.
Chen et al., Learning to See in the Dark. Published at the Conference on Computer Vision and Pattern Recognition (CVPR 2018), 10 pages.
International Search Report and Written Opinion for International Application No. PCT/US2021/040376, Search completed Sep. 3, 2021, dated Sep. 16, 2021, 16 Pgs.
Cai J., et al., "Learning a Deep Single Image Contrast Enhancer from Multi-Exposure Images," IEEE Transactions on Image Processing, vol. 27, No. 4, Apr. 30, 2018, pp. 1-14.
European Search Report for European Patent Application No. 19848151.7, dated Mar. 25, 2022, 3 pages.
Lee S., et al., "Deep Chain HDRI: Reconstructing a High Dynamic Range Image from a Single Low Dynamic Range Image," Arxiv. org, Cornell University Library, Jan. 19, 2018, pp. 1-10.
Office Action mailed Oct. 3, 2023 for Japanese Patent Application No. 2021-531458, filed on Aug. 7, 2019, 6 pages.
Office Action mailed Jan. 12, 2024 for Chinese Application No. 201980060548.6, filed Aug. 7, 2019, 11 pages.

\* cited by examiner

ARTIFICIAL INTELLIGENCE TECHNIQUES FOR IMAGE ENHANCEMENT

RELATED APPLICATIONS

This Application claims priority under 35 U.S.C. § 119(e) to U.S. Provisional Application Serial No. 62/715,732, titled "Artificial Intelligence Techniques for Image Enhancement," filed on Aug. 7, 2018, which is herein incorporated by reference in its entirety.

FIELD OF THE DISCLOSURE

The techniques described herein relate generally to methods and apparatus for using artificial intelligence (AI) techniques to enhance images.

BACKGROUND

Images (e.g., digital images, video frames, etc.) may be captured by many different types of devices. For example, video recording devices, digital cameras, image sensors, medical imaging devices, electromagnetic field sensing, and/or acoustic monitoring devices may be used to capture images. Captured images may be of poor quality as a result of the environment or conditions in which the images were captured. For example, images captured in dark environments and/or under poor lighting conditions may be of poor quality, such that the majority of the image is largely dark and/or noisy. Captured images may also be of poor quality due to physical constraints of the device, such as devices that use low-cost and/or low-quality imaging sensors.

SUMMARY OF THE DISCLOSURE

According to various aspects, systems and methods are provided for enhancing poor quality images, such as images that are captured in low light conditions and/or noisy images. An image captured by an imaging device in low light conditions may cause the captured image to have, for example, poor contrast, blurring, noise artifacts, and/or to otherwise not clearly display one or more objects in the image. The techniques described herein use artificial intelligence (AI) approaches to enhance these and other types of images to produce clear images.

Some embodiments relate to a system for training a machine learning system to enhance images. The system includes a processor and a non-transitory computer-readable storage medium storing processor-executable instructions that, when executed by the processor, cause the processor to perform: obtaining a set of training images to be used for training the machine learning system, the obtaining comprising: obtaining an input image of a scene; and obtaining a target output image of the scene by averaging a plurality of images of the scene, wherein the target output image represents a target enhancement of the input image; and training the machine learning system using the set of training images.

In some examples, the system is further configured to obtain a set of input images, wherein each input image in the set of input images is of a corresponding scene, obtain a set of target output images comprising, for each input image in the set of input images, obtaining a target output image of the corresponding scene by averaging a plurality of images of the corresponding scene, and train the machine learning system using the set of input images and the set of target output images.

In some examples, obtaining the input image comprises obtaining the input image at an ISO setting that is above a predetermined ISO threshold.

In some examples, the ISO threshold is selected from an ISO range of approximately 1500 to 500,000.

In some examples, averaging the plurality of images comprises computing an arithmetic mean across each pixel location in the plurality of images.

In some examples, obtaining the set of training images comprises obtaining a set of training images for a plurality of image capture settings.

In some examples, obtaining the set of training images comprises obtaining one or more images that capture noise of an imaging device used to capture the input set of images and the output set of images.

In some examples, the instructions further cause the processor to perform obtaining a second set of training images and retrain the machine learning system using the second set of training images.

In some examples, the instructions further cause the processor to obtain the set of training images from a respective imaging device, and train the machine learning system based on the first training set of images from the respective device to optimize enhancement by the machine learning system for the respective device.

In some examples, the machine learning system comprises a neural network.

In some examples, training the machine learning system comprises minimizing a linear combination of multiple loss functions.

In some examples, training the machine learning system comprises optimizing the machine learning system for performance in a frequency range perceivable by humans.

In some examples, training the machine learning system includes obtaining an enhanced image generated by the machine learning system corresponding to a respective input image, obtaining a respective target output image of the set of target output images corresponding to the respective input image, passing the enhanced image and the target output image through a bandpass filter, and training the machine learning system based on the filtered enhanced image and filtered target output image.

In some examples, training the machine learning system includes obtaining a noise image associated with an imaging device used to capture the set of training images, wherein the noise image captures noise generated by the imaging device, and including the noise image as an input into the machine learning system.

In some examples, obtaining the set of training images to be used for training the machine learning system includes obtaining a set of input images using a neutral density filter, wherein each image of the set of input images is of a corresponding scene, and obtaining a set of target output images, comprising for each input image in the set of input images, obtaining a target output image of the corresponding scene that is captured without the neutral density filter, wherein the target output image represents a target enhancement of the input image.

Some embodiments relate to a system for automatically enhancing an image. The system includes a processor, and a machine learning system implemented by the processor, the machine learning system configured to receive an input image, and to generate, based on the input image, an output image comprising at least a portion of the input image that is more illuminated than in the input image. The machine learning system is trained based on a set of training images including an input image of a scene, and a target output image of the scene, wherein the target image is obtained by averaging a plurality of images of the scene, wherein the target output image represents a target enhancement of the input image.

In some examples, one or more input images of the set of training images are captured with a neutral density filter, and one or more output images of the set of training images are captured without the neutral density filter.

In some examples, the processor is configured to receive a first image, divide the first image into a first plurality of image portions, input the first plurality of image portions into the machine learning system, receive a second plurality of image portions from the machine learning system, and combine the second plurality of images to generate an output image.

In some examples, the machine learning systems is configured to, for a respective one of the first plurality of image portions, crop a portion of the respective image portion, wherein the portion of the respective image portion comprises a subset of pixels of the respective image portion.

In some examples, the processor is configured to determine a size of the first plurality of portions, and divide the first image into the first plurality of portions, wherein each of first plurality of portions has the size.

In some examples, the machine learning system comprises a neural network comprising a convolutional neural network or a densely connected convolutional neural network.

In some examples, the processor is configured to obtain a first image, quantize the first image to obtain a quantized image, input the quantized image into the machine learning system, and receive, from the machine learning system, a respective output image.

Some embodiments relate to a computerized method for training a machine learning system to enhance images. The method includes obtaining a set of training images to be used for training the machine learning system, the obtaining including obtaining an input image of a scene, and obtaining a target output image of the scene by averaging a plurality of images of the scene, wherein the target output image represents a target enhancement of the input image. The method includes training the machine learning system using the set of training images.

Some embodiments relate to a method of training a machine learning model for enhancing images. The method includes using at least one computer hardware processor to perform accessing a target image of a displayed video frame, wherein the target image represents a target output of the machine learning model, accessing an input image of the displayed video frame, wherein the input image corresponds to the target image and represents an input to the machine learning model, and training the machine learning model using the target image and the input image corresponding to the target image to obtain a trained machine learning model.

In some examples, the method further includes capturing, using an imaging device, the target image of the displayed video frame using a first exposure time, and capturing, using the imaging device, the input image of the displayed video frame using a second exposure time, wherein the second exposure time is less than the first exposure time.

In some embodiments, the method further includes capturing, using an imaging device, the input image of the displayed video frame with a neutral density filter, and capturing, using the imaging device, the target image of the displayed video frame without a neutral density filter.

In some examples, the method includes capturing, using an imaging device, the input image of the displayed video frame, and capturing, using the imaging device, the target image of the displayed video frame by averaging each pixel location of multiple stationary captures of the video frame.

In some examples, the method includes capturing, using an imaging device, the target image of the displayed video frame using a first exposure time, wherein the displayed video frame is displayed at a first brightness, and capturing, using the imaging device, the input image of the displayed video frame using the first exposure time, wherein the displayed video frame is displayed at a second brightness darker than the first brightness.

In some examples, the input image and the target image each comprise the displayed video frame at an associated inner portion, such that the input image and target image include second data different than the data associated with the displayed video frame, and the method further includes cropping each of the input image and the target image to include the first data and to exclude the second data.

In some examples, the input image and the target image each comprise a same first number of pixels that is less than a second number of pixels of the display device displaying the video frame.

In some examples, the method includes accessing an image, providing the image as input to the trained machine learning model to obtain a corresponding output indicating updated pixel values for the image, and updating the image using the output from the trained machine learning model.

In some examples, the method includes accessing a plurality of additional target images, wherein each target image of the additional target images is of an associated displayed video frame, and represents an associated target output of the machine learning model for the associated displayed video frame. The method includes accessing additional input images, wherein each input image of the additional input images corresponds to a target image of the additional target images, such that the input image is of the same displayed video frame as the corresponding target image, and represents an input to the machine learning model for the corresponding target image. The method includes training the machine learning model using (a) the target image and the input image corresponding to the target image, and (b) the plurality of additional target images and the plurality of additional associated input images, to obtain a trained machine learning model.

Some embodiments relate to a system for training a machine learning model for enhancing images. The system includes a display for displaying a video frame of a video and a digital imaging device configured to capture a target image of the displayed video frame, wherein the target image represents a target output of the machine learning model, and capture an input image of the displayed video frame, wherein the input image corresponds to the target image and represents an input to the machine learning model. The system includes a computing device comprising at least one hardware processor and at least one non-transitory computer-readable storage medium storing processor-executable instructions that, when executed by the at least one hardware processor, cause the at least one hardware processor to perform accessing the target image and the input image and training the machine learning model using the target image and the input image corresponding to the target image to obtain a trained machine learning model.

In some examples, the display comprises a television, a projector, or some combination thereof.

Some embodiments relate to at least one computer readable storage medium storing processor-executable instructions that, when executed by at least one processor, cause the at least one processor to perform accessing a target image of a displayed video frame, wherein the target image represents a target output of a machine learning model, accessing an input image of the displayed video frame, wherein the input image corresponds to the target image and represents an input to the machine learning model, and training the machine learning model using the target image and the input image corresponding to the target image to obtain a trained machine learning model.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1A:
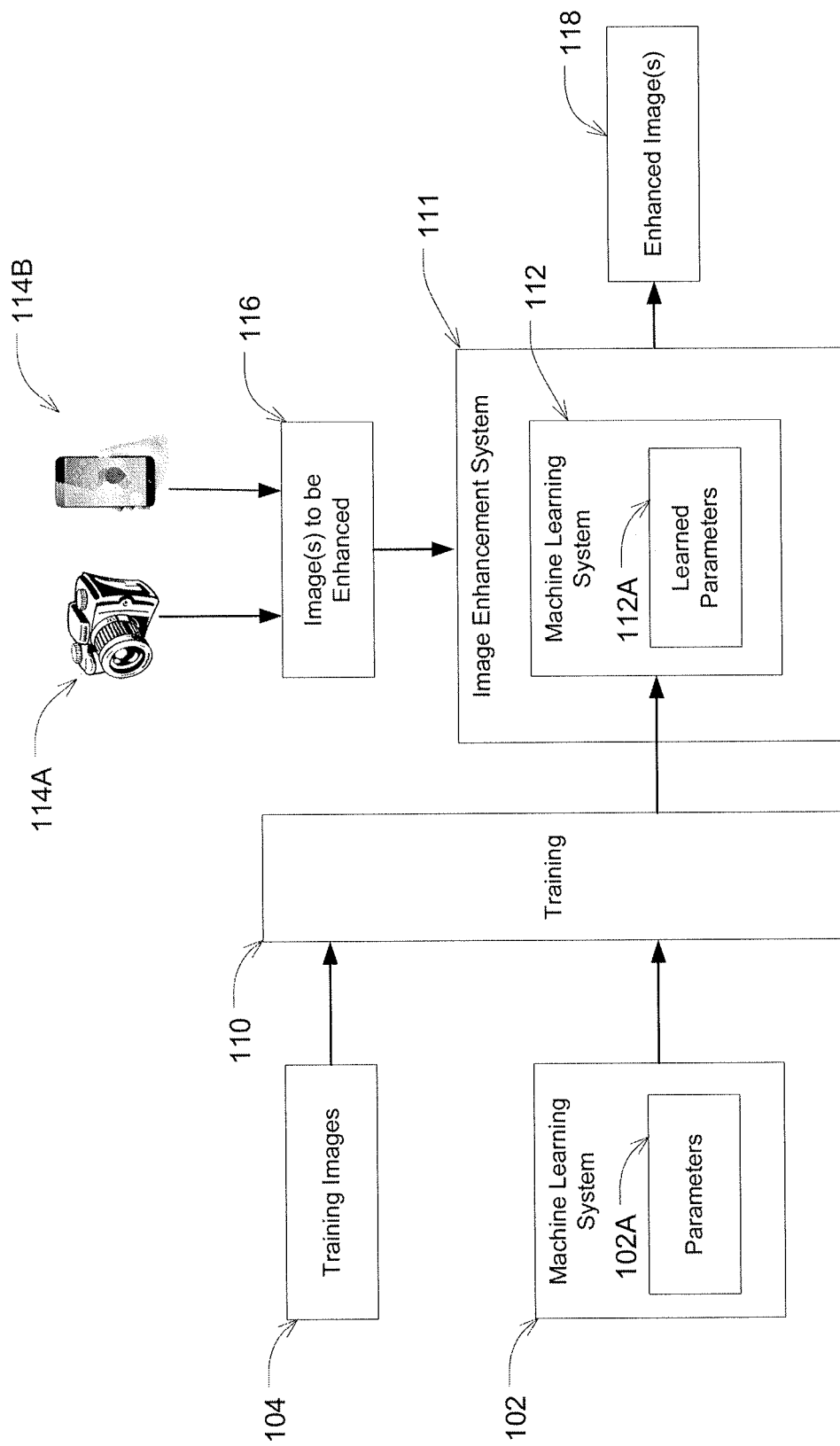
FIGS. 1A-B show block diagrams illustrating operation of an image enhancement system, according to some embodiments.

The inventors have recognized that imaging devices (e.g., digital cameras, image sensors, medical imaging devices, and/or electromagnetic field sensors) may perform poorly when capturing noisy images, such as images captured in low light. For example, a digital camera may have an image sensor that receives light waves via an optical lens, which are typically subsequently filtered through a color filter array (CFA), and converts the received light waves into electrical signals. The electrical signals are then converted into one or more digital values (e.g., red, blue, and green (RGB) channel values) through a chain of image signal processing (ISP) algorithms. The quality of images captured by the imaging device may be poor in conditions where there is a low amount of lighting. For example, in a digital camera, the image sensor may not be sensitive enough to capture enough information to distinguish one or more objects in the image when there is a low amount of light. Thus low light may lead to images with poor contrast, noise artifacts, and/or blurred objects in the image.

Conventional solutions for capturing images in low light may involve the use of imaging sensors that are specialized for performance in low light. Such a sensor, however, may have a larger size relative to other imaging sensors. For example, a digital camera for a smartphone may be unable to incorporate such a specialized sensor into the smartphone because of size restrictions. The specialized sensor may also require more power and other resources, and thus reduce efficiency of a device (e.g., a smartphone). Furthermore, such specialized sensors are often significantly more expensive than imaging sensors that are not specialized for operation in low light. Other solutions often have narrow use cases that cannot be implemented across different applications. For example, the addition of an infrared or thermal sensor, LIDAR, and/or the like may be used to improve images captured in low light. This, however, often requires additional hardware and resources. Many resource constrained devices may be unable to incorporate such solutions.

The inventors have developed techniques for enhancing noisy images, such as those captured in low light conditions, to obtain a higher quality image without requiring an addition or change in existing hardware of a device. The techniques can also provide better performance than other conventional techniques, such as traditional ISP algorithms. The enhanced images may further provide improved performance of other applications that utilize the image such as image segmentation, object detection, facial recognition, and/or other applications.

Supervised learning generally refers to the process of training a machine learning model using input-output training data sets. The machine learning model learns how to map between the input-output pairs of training data, such as by using a neural network to find the proper model parameters (e.g., such as weights and/or biases) to perform the conversion properly, allowing the machine learning model to handle new data. Machine learning techniques may be used to enhance images and/or video captured by an imaging device without requiring an addition or change in existing hardware of a device. For example, an image or video captured by a digital camera may be provided as input to a trained machine learning model to obtain an output of an enhanced version of the image or video. The inventors have developed techniques for controlled generation of input-output sets of images that can be used to train a machine learning model used to enhance new input images or video frames. In some embodiments, the machine learning model can be used to perform low-light enhancement of dark input images to produce bright, high quality target images. In some embodiments, the machine learning model can be used to perform denoising of input images (e.g. taken at high ISO values) to produce denoised target images. For ease of explanation, without intending to be limiting, the input images may also be referred to herein as "dark images," and the output images may be referred to herein as "target images" and/or "bright images." Target images may represent aspects of target illuminated outputs that are to be generated by the machine learning model.

It should be understood that the terms "dark images" and "bright images" are used herein for ease of explanation, but are not intended to only refer to brightness or to exclude characteristics of images that do not relate to brightness. For example, the techniques can be used to process noisy images to generate images with a better signal-to-noise ratio. Therefore, while some examples described herein refer to dark images and bright images, it should be appreciated that the techniques can be used to process various types of undesirable aspects of the input images, including noise, brightness, contrast, blurring, artifacts, and/or other noise artifacts. Thus, the input images processed using the techniques described herein can be any type of image with undesirable aspects, and the output images can represent the image with the undesirable aspects mitigated and/or removed (e.g., which can be generated using machine learning techniques, as described herein).

The inventors have discovered and appreciated that enhancement of raw imaging data using supervised learning (e.g. with neural networks) can be achieved using input-output, also referred to herein as input-target, training pairs of dark and bright images, such as pairs of dark input images and corresponding bright target images of a same object or scene. Some techniques used to capture the input-target images includes photographing a real-world object or scene with low illumination, whereby the dark image is captured with a short exposure (e.g., $1/15^{th}$ or $1/30^{th}$ of a second) and the bright image can be captured with a long exposure (e.g., 1 second, 2 seconds, 10 seconds or more). By using a long exposure, the resulting bright image is much brighter, and appears as if there is a lot more ambient light than otherwise is present in the scene. Using input-target images capturing a low illumination scene can train the machine learning model using input images captured under similar illuminations as the expected input images that will be processed using the machine learning model, which can cause the machine learning model to capture noise characteristics of the imaging device when used in low illumination conditions.

However, the inventors have recognized that performance of a machine learning model in enhancing images captured by a device is limited by the quality of training data (e.g., input images and/or corresponding target output images) used to train the machine learning model. A machine learning model trained using input images that more accurately represent images that would be captured by a device in low light will provide better enhancement of images captured by the device in low light. The inventors have also recognized that it is desirable to provide a broad range of real-world training data, including data collected for various real-world scenes and locations. However, capturing bright images in this manner can be complicated by the fact that scenes with motion, which can be desirable for training purposes, may cause blur in the bright image. Since many real-world scenes include motion, existing techniques cannot be used to sufficiently capture input-target image pairs of such scenes. In particular, it can be difficult, if not impossible, to capture the bright consecutive frames of scenes with motion for purposes of video enhancement. For example, when photographing a scene, a photograph may exhibit blur due to the motion. Similarly, when capturing a video of a scene, it may be desirable to capture a bright frame of the scene (e.g., that is only a $30^{th}$ of a second long), but it may be difficult to capture such an image, such as when using a dark environment to also capturing dark images of the scene.

Additionally, in order to capture a wide data set with images of different scenes, which can also be desirable for training purposes, an operator needs to physically move the camera to each location and/or around at various imaging points at each location, which further limits the practicality in adequately gathering sufficient training data. For example, in order to capture a sufficient number of input-target image pairs of a scene may require moving the camera to hundreds or thousands of locations in the scene as well as hundreds of thousands of different locations. Since such techniques require the camera to be physically present at each location, it can significantly limit the robustness of the training data due to practical constraints on time, travel, and/or the like.

The inventors have developed computerized techniques to simulate real-world data using pre-captured video. The techniques include using a display device (e.g., a television or a projector) that displays video frames on a frame-by-frame basis. In some embodiments, the pre-captured video allows frames to be displayed for a sufficient duration and/or at a sufficient brightness to enable an imaging device to capture both dark images and bright images of the same video frame. The target image can therefore represent the scene in the video frame as if it were captured by an imaging device under normal lighting conditions, and the input image may represent the scene in the video frame as if it were captured by an imaging device in low light. In some embodiments, the imaging device can capture a dark image of the frame using a short exposure time and a bright image of the frame using a long exposure time. In some embodiments, the brightness of the display can be adjusted to allow bright images to be captured with shorter exposure times than typically used and/or using a similar exposure time as that used to capture the dark images. The techniques described herein therefore provide for controlled generation of dark and bright images of each video frame. By capturing images on a frame-by-frame basis, the techniques can be used to generate input-target image pairs of scenes with motion such that the individual input-target image pairs do not exhibit artifacts due to blurring. The techniques can enable rapid data collection over a variety of scenes, instead of requiring the imaging devices to be physically present at (and physically moved to) thousands of actual locations to collect sufficient training data.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

According to one aspect, a system is provided to enhance noisy images, such as images captured in low light conditions. The system uses a set of training images to train a machine learning system that is to be used for enhancing images. The system uses an input set of training images that represent images captured in low light conditions (e.g., the "dark" images, which exhibit some sort of noise). This input set of images can be, for example, representative of low light images that would be input into the machine learning system for enhancement. The system uses an output set of training images that correspond to the first set of training images. The output set of images may be target versions of the first set of images that are to be output by the machine learning system after processing the input images (e.g., the "light" or "bright" images, which include less noise than the input images). In some embodiments, the first and second set of images may be used respectively as inputs and outputs of training data in a supervised learning scheme to train the machine learning system.

In some embodiments, the system may be trained to increase a level of luminance in an input image. In some embodiments, the system may be configured to generate an output image with the increased luminance. In some embodiments, the system may increase the luminance of the input image by 2, 3, 4, 5, 6, 7, 8, 9, 10, 11, 12, 13, 14, 15, 16, 17, 18, 19 and/or 20 times. In some embodiments, the system may be configured to increase the luminance of one or more portions of the input image by a different amount relative to one or more other portions of the input image. In some embodiments, the system may be configured to increase the luminance of the input image by 5 to 15 times. In some embodiments, the system may be configured to increase the luminance of the input image by 6 to 13 times. In some embodiments, the system may be configured to increase the luminance of the input image by at least 2, 3, 4, 5, 6, 7, 8, 9, 10, 11, 12, 13, 14, 15, 16, 17, 18, 19, or 20 times.

In some embodiments, the system may be trained to remove noise artifacts corrupting the input image, such as brightness, contrast, blurring, and/or the like. By removing noise artifacts that are corrupting the input image, the techniques can increase the signal-to-noise ratio of the image. For example, the techniques can increase the signal-to-noise ratio by, for example, approximately 2-20 dB.

In some embodiments, the input set of images are obtained by capturing images with an imaging device using a neutral density filter. A neutral density filter is an optical filter that reduces or modifies the intensity of light that enters a lens of the imaging device. The inventors have recognized that using a neutral density filter to generate the set of input images in the training set can accurately reflect characteristics of images taken in low light. For example, images captured by the neutral density filter have noise characteristics that resemble those in images captured in low light conditions. An output image corresponding to a respective input image in the training set may be obtained by capturing the same image with the imaging device without using the neutral density filter. An output image represents a target enhanced version of a respective input image based on which the machine learning system may be trained. The inventors have recognized that the use of the neutral density filter provides a training set of images that reflects noise characteristics that would be in images captured in low light conditions, while reducing variations between the input set and output set that would result from using other camera settings (e.g., changing the ISO setting, reducing the light source intensity, and/or reducing exposure time).

In some embodiments, the input set of images are obtained by capturing images with a high ISO value, which can, for example, improve and/or maximize the quantization accuracy of low-intensity pixel values in the digital sampling process. In some embodiments, the ISO value can be an ISO value that is within the range of approximately 1600-500,000. For example, high-end consumer cameras can have ISO's up to 500,000. In some embodiments, the value can be higher than 500,000, such as up to 5 million for specialized hardware implementations. In some embodiments, the ISO value can be selected such that it is above an ISO threshold. An output image corresponding to a respective input image in the training set may be obtained by producing multiple captures of the input image (e.g., at the same and/or a similar ISO setting used to capture the input set of images) and subsequently processing the set of input images, such as by averaging the intensities for each pixel across the multiple captures. An output image represents a target enhanced version of a respective input image based on which the machine learning system may be trained. The inventors have recognized that while in some embodiments a single and/or a few long exposures can be used to capture the output image, using long exposures can change the noise properties of the sensor, for example by increasing thermal noise. Averaging pixel intensities across a set of short exposures (e.g., a large set of short exposures, such as 50, 100, 200, etc.) that are taken with cooling intervals (e.g.1-second cooling intervals between sequential captures) can keep the thermal noise properties of the output consistent with that of the input frame, can enable the neural network to learn a simpler transformation function, and/or can allow for a more compressible neural network model.

According to another aspect, a system is provided to divide input images into multiple image portions. The system may then feed the portions as individual inputs to the machine learning system. The system may be configured to stitch together individual enhanced output portions to generate a final enhanced image. The inventors have recognized that dividing an image into portions allows the system to perform training, and enhancement of images faster than processing an entire image at once.

According to another aspect, a system is provided that includes as input images in a training set of images for training the machine learning system one or more images that include only noise from sensors of the camera (also referred to herein as a "noise image"). The image(s) may be captured with near zero exposure such that the only pixel values of the image result from noise generated from components (e.g., imaging sensors) of the imaging device. The system may be configured to use the noise image(s) to reduce the effect of sensor noise on image enhancement performed using the machine learning system. This may normalize image enhancement performance of the AI system across various imaging device settings (e.g., ISO settings, and exposure time).

According to another aspect, a system is provided to train a machine learning system such that the machine learning system is optimized for enhancing image features that are perceptible to humans. In some embodiments, the system may be configured to optimize the machine learning system for frequencies that are perceivable by humans. The system may be configured to train the machine learning system such that it performs optimally for the frequencies.

Described herein are systems and computerized techniques for controlled generation of training data that can be used to train a machine learning model for image enhancement. A display device, such as a television or projector, can display a frame of a video in a controlled manner so that the displayed frame can be used to generate the training data. An imaging device (e.g., a digital camera) can be configured to capture a target image and an input image of the displayed video frame. The target and input images can be captured using different exposure times and/or by adjusting the brightness of the display. In some embodiments, the target image may be an image captured of the video frame that represents the scene in the video frame as if it were captured by an imaging device under normal lighting conditions (e.g., referred to herein as a "bright image"), and the input image may be an image captured of the video frame that represents the scene in the video frame as if it were captured by an imaging device in low light (e.g., referred to herein as a "dark image"). The input-target image generation process can be repeated to generate a training data set that includes a plurality of input image and associated target images.

The input images and target images may then be used to train the machine learning model. In some embodiments, the machine learning model can be used to process dark images to generate corresponding bright images. The target image may represent target illuminated output (e.g., such as red, green and/or blue values, raw Bayer pattern values, thermal/infrared sensor data, and/or the like) to be generated by enhancing illumination of the dark image. Thus, training data that includes a set of dark images and corresponding target images may be used to train a machine learning model that can be used to enhance images captured in low light conditions by illuminating the images.

In some embodiments, a data set that includes sets of generated dark input images and corresponding well-illuminated target images may be used to train a machine learning model to illuminate images captured by an imaging device (e.g., images captured under low-light conditions). For example, the machine learning model can be trained to generate a target bright image based on a corresponding dark image. The training process can therefore train the machine learning model to generate, based on a new dark image, output illumination (e.g., raw pixel data for each pixel, red, green, blue (RGB) values for each pixel, etc.) that corresponds to a bright image based on illumination (e.g., raw pixel data for each pixel, RGB values for each pixel, etc.) of the dark image.

An image may be a photograph. For example, an image may be a photograph captured by an imagine device (e.g., a digital camera). An image may also be a portion of a video. For example, an image may be one or more frames that make up a video.

Some embodiments described herein address the above-described issues that the inventors have recognized with conventional image enhancement systems. However, it should be appreciated that not every embodiment described herein addresses every one of these issues. It should also be appreciated that embodiments of the technology described herein may be used for purposes other than addressing the above-discussed issues in image enhancement.

FIG. 1A shows a machine learning system 102 with a set of parameters 102A. In some embodiments, the machine learning system 102 may be a system configured to receive an input image, and generate an enhanced output image. The machine learning system 102 may learn values of the parameters 102A during a training stage 110 based on a set of training images 104. After the training stage 110, a trained machine learning system 112 is obtained that is configured with learned parameter values 112A. The trained machine learning system 112 is used by image enhancement system 111 to enhance one or more images 116 captured by various imaging devices 114A-B. The image enhancement system 111 receives the image(s) 116 and outputs one or more enhanced images 118.

In some embodiments, the machine learning system 102 may be a machine learning system for enhancing images that were captured in low light conditions. In some embodiments, images captured in low light conditions may be those in which a sufficient amount of light intensity was not present to capture one or more objects in an image. In some embodiments, an image captured in low light conditions may be an image captured with a light source of less than 50 lux. In some embodiments, an image captured in low light conditions may be an image captured with a light source of less than or equal to 1 lux. In some embodiments, an image captured in low light conditions may be an image captured with a light source of less than or equal to 2 lux, 3 lux, 4 lux, or 5 lux. The machine learning system 102 may be configured to receive an input image that was captured in low light settings, and generate a corresponding output image that displays objects as if they had been captured with a light source of greater intensity.

In some embodiments, the machine learning system 102 may include a neural network with one or more parameters 102A. The neural network may be made up of multiple layers, each of which has one or more nodes. The parameters 102A of the neural network may be coefficients, weights, filters, or other types of parameters used by nodes in layers of the neural network. A node combines input data using the coefficients to generate an output value that is passed into an activation function of the node. The activation function generates an output value that is passed to the next layer of the neural network. The values generated by a final output layer of the neural network may be used to perform a task. In some embodiments, the final output layer of the neural network may be used to generate an enhanced version of an input image. For example, the values of the output layer may be used as inputs to a function for generating pixel values for an image that is to be output by the neural network. In some embodiments, the output layer of the neural network may comprise an enhanced version of the input image. For example, the output layer of the neural network may specify a value pixels of an enhanced version of the input image.

In some embodiments, the machine learning system 102 may include a convolutional neural network (CNN). The CNN may be made up of multiple layers of nodes. The parameters 102A may include filters that are applied at each layer of the CNN. Each layer of the CNN may be a set of one or more learnable filters with which an input to the layer in convolved. The results of the convolutions with each of the filter(s) are used to generate an output of the layer. The output of the layer may then be passed to a subsequent layer for another set of convolution operations to be performed by one or more filters of the subsequent layer. In some embodiments, the final output layer of the CNN may be used to generate an enhanced version of an input image. For example, the values of the output layer may be used as inputs to a function for generating pixel values for an image that is to be output by the neural network. In some embodiments, the output layer of the neural network may comprise an enhanced version of the input image. For example, the output layer of the CNN may specify a values for pixels of an enhanced image. In some embodiments, the convolutional neural network is a U-Net.

In some embodiments, the machine learning system 102 may include an artificial neural network (ANN). In some embodiments, the machine learning system 102 may include a recurrent neural network (RNN). In some embodiments, the machine learning system 102 may include a decision tree. In some embodiments, the machine learning system 102 may include a support vector machine (SVM). In some embodiments, the machine learning system may include genetic algorithms. Some embodiments are not limited to a particular type of machine learning model. In some embodiments, the machine learning system 102 may include a combination of one or more machine learning models. For example, the machine learning system 102 may include one or more neural networks, one or more decision trees, and/or one or more support vector machines.

After the machine learning system is trained during the training stage 110, a trained machine learning system 112 is obtained. The trained machine learning system 112 may have learned parameters 112A that optimize performance of image enhancement performed by the machine learning system 112 based on the training images 104. The learned parameters 112A may include values of hyper-parameters of the machine learning system, values of coefficients or weights of the machine learning system, and values of other parameters of the machine learning system. Some parameters of the learned parameters 112A may be determined manually during the training stage 110, while others may be determined by automated training techniques performed during the training stage 110.

In some embodiments, the image enhancement system 111 uses the trained machine learning system 112 to perform image enhancement of one or more images 116 received from one or more imaging devices 114A-B. For example, the imaging device(s) may include a camera 114A, and a digital camera of a smart phone 114B. Some embodiments are not limited to images from a imaging devices described herein, as the machine learning system 112 may enhance images received from different imaging devices.

The image enhancement system 111 uses the received image(s) 116 to generate inputs to the trained machine learning system 112. In some embodiments, the image enhancement system 111 may be configured to use pixel values of the image(s) 116 as inputs to one or more machine learning models (e.g., neural network(s)). In some embodiments, the image enhancement system 111 may be configured to divide the image(s) 116 into portions, and feed pixel values of each portion separately into the machine learning system 112 as inputs. In some embodiments, the received image(s) 116 may have values for multiple channels. For example, the received image(s) 116 may have a value for a red channel, green channel, and blue channel. These channels may also be referred to herein as "RGB channels."

After enhancing the received image(s) 116, the image enhancement system 111 outputs the enhanced image(s) 118. In some embodiments, the enhanced image(s) 118 may be output to a device from which the image(s) 116 were received. For example, the enhanced image(s) 118 may be output to mobile device 114B from which the image(s) 116 were received. The mobile device 114B may display the enhanced image(s) 118 in a display of the device 114B, and store the enhanced image(s) 118. In some embodiments, the image enhancement system 111 may be configured to store the generated enhanced image(s) 118. In some embodiments, the image enhancement system 111 may be configured to use the enhanced image(s) 118 for subsequent evaluation of performance of the image enhancement system 111 and/or retraining of the machine learning system 112.

In some embodiments, the image enhancement system 111 may be deployed on a device from which the image(s) 116 were received. For example, the image enhancement system 111 may be part of an application installed on the mobile device 114B that, when executed by the mobile device 114B, performs enhancement of the received image (s) 116. In some embodiments, the image enhancement system 111 may be implemented on one or more separate computers. The image enhancement system 111 may receive the image(s) 116 via a communication interface. The communication interface may be a wireless network connection, or a wired connection. For example, the image enhancement system 111 may be implemented on a server. The server may receive the image(s) 116 via a network (e.g., via the Internet). In another example, the image enhancement system 111 may be a desktop computer which receives the image(s) 116 via a wired connection (e.g., USB) from one or more of the devices 114A-B. Some embodiments are not limited by how the image enhancement system 111 obtains the image(s) 116.

Figure 1B:
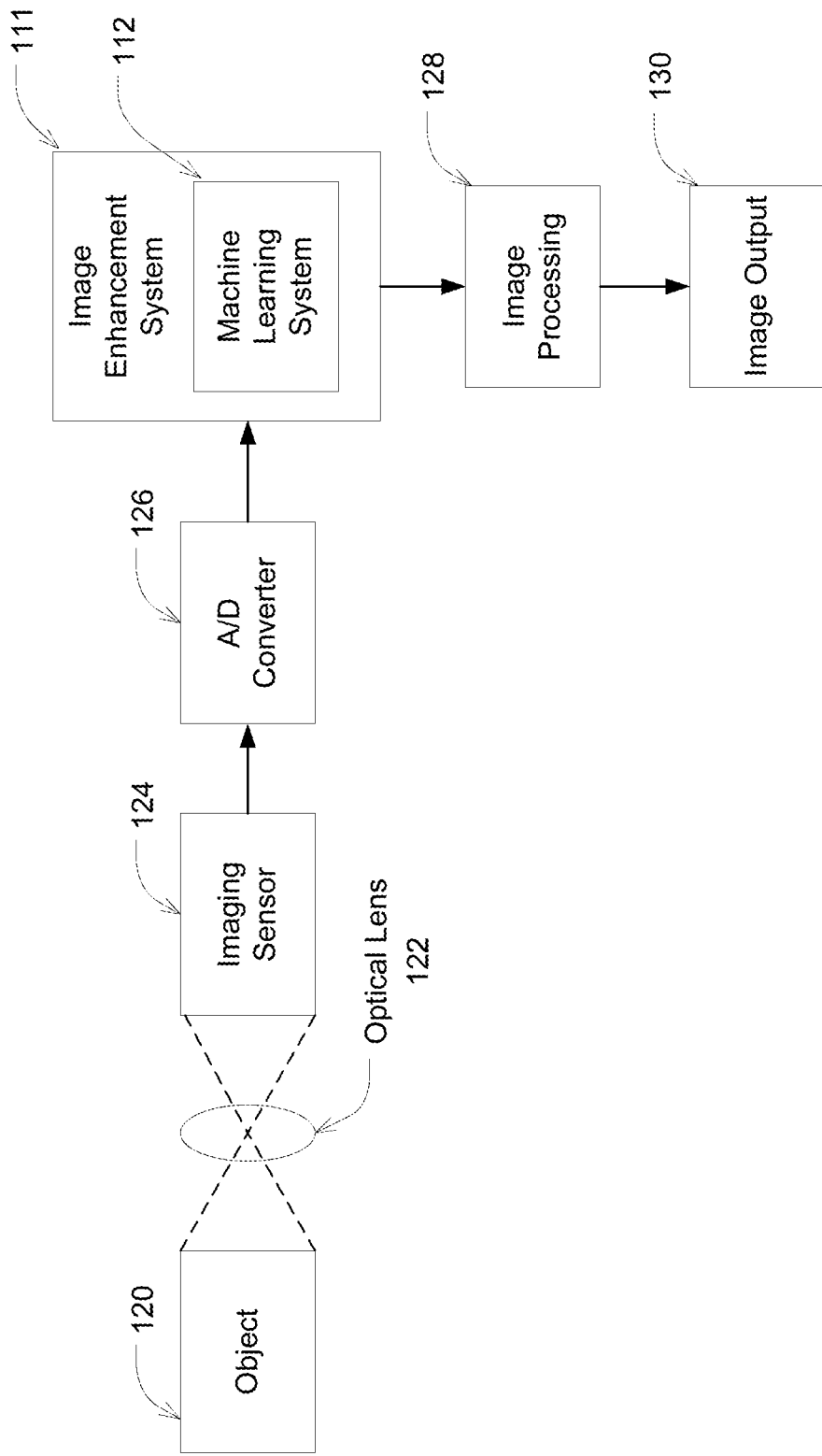

FIG. 1B illustrates an example implementation of the image enhancement system 111 for performing image enhancement of an image captured by an imaging device (e.g., imaging device 114A or 114B). Light waves from an object 120 pass through an optical lens 122 of the imaging device and reach an imaging sensor 124. The imaging sensor 124 receives light waves from the optical lens 122, and generates corresponding electrical signals based on intensity of the received light waves. The electrical signals are then transmitted to an analog to digital (A/D) converter which generates digital values (e.g., numerical RGB pixel values) of an image of the object 120 based on the electrical signals. The image enhancement system 111 receives the image 111 and uses the trained machine learning system 112 to enhance the image. For example, if the image of the object 120 was captured in low light conditions in which objects are blurred and/or there is poor contrast, the image enhancement system 111 may de-blur the objects and/or improve contrast. The image enhancement system 111 may further improve brightness of the images while making the objects more clearly discernible to the human eye. The image enhancement system 111 may output the enhanced image for further image processing 128. For example, the imaging device may perform further processing on the image (e.g., brightness, white, sharpness, contrast). The image may then be output 130. For example, the image may be output to a display of the imaging device (e.g., display of a mobile device), and/or be stored by the imaging device.

In some embodiments, the image enhancement system 111 may be optimized for operation with a specific type of imaging sensor 124. By performing image enhancement on raw values received from the imaging sensor before further image processing 128 performed by the imaging device, the image enhancement system 111 may be optimized for the imaging sensor 124 of the device. For example, the imaging sensor 124 may be a complementary metal-oxide semiconductor (CMOS) silicon sensor that captures light. The sensor 124 may have multiple pixels which convert incident light photons into electrons, which in turn generates an electrical signal is fed into the A/D converter 126. In another example, the imaging sensor 124 may be a charge-coupled device (CCD) sensor. Some embodiments are not limited to any particular type of sensor.

In some embodiments, the image enhancement system 111 may be trained based on training images captured using a particular type or model of an imaging sensor. Image processing 128 performed by an imaging device may differ between users based on particular configurations and/or settings of the device. For example, different users may have the imaging device settings set differently based on preference and use. The image enhancement system 111 may perform enhancement on raw values received from the A/D converter to eliminate variations resulting from image processing 120 performed by the imaging device.

In some embodiments, the image enhancement system 111 may be configured to convert a format of numerical pixel values received from the A/D converter 126. For example, the values may be integer values, and the image enhancement system 111 may be configured to convert the pixel values into float values. In some embodiments, the image enhancement system 111 may be configured to subtract a black level from each pixel. The black level may be values of pixels of an image captured by the imaging device with show no color. Accordingly, the image enhancement system 111 may be configured to subtract a threshold value from pixels of the received image. In some embodiments, the image enhancement system 111 may be configured to subtract a constant value from each pixel to reduce sensor noise in the image. For example, the image enhancement system 111 may subtract 60, 61, 62, or 63 from each pixel of the image.

In some embodiments, the image enhancement system 111 may be configured to normalize pixel values. In some embodiments, the image enhancement system 111 may be configured to divide the pixel values by a value to normalize the pixel values. In some embodiments, the image enhancement system 111 may be configured to divide each pixel value by a difference between the maximum possible pixel value and the pixel value corresponding to a black level (e.g., 60, 61, 62, 63). In some embodiments, the image enhancement system 111 may be configured to divide each pixel value by a maximum pixel value in the captured image, and a minimum pixel value in the captured image.

In some embodiments, the image enhancement system 111 may be configured to perform demosaicing to the received image. The image enhancement system 111 may perform demosaicing to construct a color image based on the pixel values received from the A/D converter 126. The system 111 may be configured to generate values of multiple channels for each pixel. In some embodiments, the system 111 may be configured to generate values of four color channels. For example, the system 111 may generate values for a red channel, two green channels, and a blue channel (RGGB). In some embodiments, the system 111 may be configured to generate values of three color channels for each pixel. For example, the system 111 may generate values for a red channel, green channel, and blue channel.

In some embodiments, the image enhancement system 111 may be configured to divide up the image into multiple portions. The image enhancement system 111 may be configured to enhance each portion separately, and then combine enhanced versions of each portion into an output enhanced image. The image enhancement system 111 may generate an input to the machine learning system 112 for each of the received inputs. For example, the image may have a size of 500×500 pixels and the system 111 may divide the image into 100×100 pixel portions. The system 111 may then input each 100×100 portion into the machine learning system 112 and obtain a corresponding output. The system 111 may then combine the output corresponding to each 100×100 portion to generate a final image output. In some embodiments, the system 111 may be configured to generate an output image that is the same size as the input image.

Figure 2A:
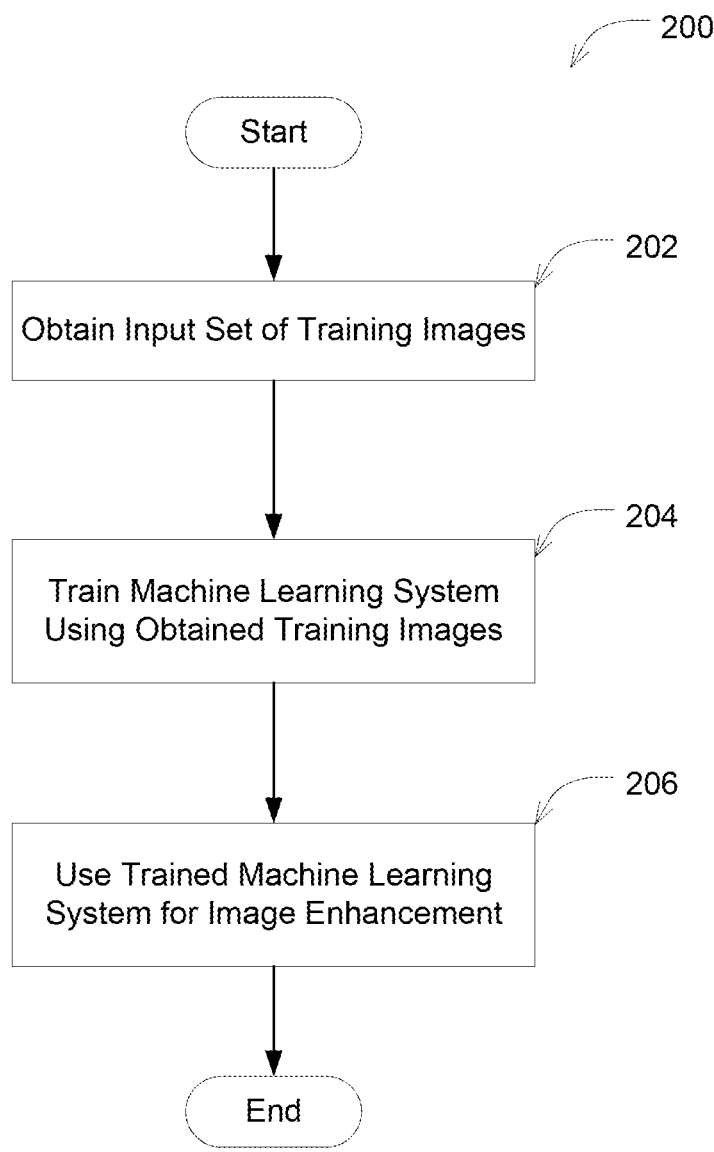
FIG. 2A shows a process for training a machine learning system, according to some embodiments.

FIG. 2A shows a process 200 for training a machine learning system, in accordance with some embodiments. Process 200 may be performed as part of training stage 110 described above with reference to FIGS. 1A-B. For example, process 200 may be performed to train machine learning system 102 with parameters 102A to obtain trained machine learning system 112 with learned parameters 112A. Process 200 may be performed using any computing device (s) which include one or more hardware processors, as aspects of the technology are not limited in this respect.

Process 200 begins at block 202, where the system executing process 200 obtains a set of training images. The system may obtain training images that represent enhancement of images that are expected to be performed by the machine learning system. In some embodiments, the system may be configured to obtain a set of input images, and a corresponding set of output images. The output images provide a target enhanced outputs for the input images to be generated by a machine learning system that is being trained. In some embodiments, the input images may be images that represent images captured in low light conditions. The input images may also be referred to herein as "dark images." The output images may be corresponding output images that represent enhanced versions of the dark images that have increased illumination in the image. The output images may be referred to herein as "light images." The system may obtain training images captured by one or more imaging devices, including digital cameras, video recording devices, and/or the like, as described herein. For example, in some embodiments the images can be video frames, which can be processed using the techniques described herein. The system may be configured to receive the images via a wired connection, or wirelessly (e.g., via a network connection).

In some embodiments, the system may be configured to obtain dark images. The dark images may capture one or more scenes using a mechanism to mimic low light conditions. In some embodiments, the system may obtain the dark images by reducing exposure time of an imaging device used for capturing the images. The corresponding light images may then be captured by increasing the exposure time used by the imaging device. In some embodiments, the system may obtain the dark images by reducing intensity of a light source that provides lighting to the object(s), and then capturing the images. The corresponding light images may then be captured by increasing the intensity of the light source. The inventors have recognized that use of a neutral density filter can represent low light conditions more accurately than other techniques. For example, the neural density filter can allow the rest of the camera settings to remain the same as if the image was captured using normal light. Therefore, the neural density filter can neutralize those camera settings in the training data. When capturing the dark images using other techniques, such as by reducing exposure time, the dark images may not accurately capture the noise properties of the image sensor. Reducing the exposure time may, for example, reduce the time of the electronic noise in the sensor (e.g., thermal noise, dark current, etc.). Such noise reduction may therefore cause the captured images to not realistically reflect the electronic noise in the data set, which can be an important part of processing the images (e.g., since it can be an important part of the training process to learn how to cancel and/or suppress the noise that is inherent in the dark images). As another example, when reducing the light source intensity, the image may still not have a uniform distribution of the intensities (e.g., such that some parts are illuminated more than others, which can affect the training step). An example process 210 for obtaining the training images using a neutral density filter is described below with reference to FIG. 2B.

Some embodiments may obtain dark and light images using a combination of approaches. For example, some neutral density filters may be discretized, such that each time the filter is adjusted, it may double the neural density filter factor in a way that cuts the amount of light in half. Therefore, other aspects of the camera system may be adjusted to refine the stepwise adjustment of the system. For example, the exposure time can be adjusted to allow for adjustments that reduces the light in a more refined manner (e.g., which does not cut the light in half, as would be done by adjusting the filter).

In some embodiments, the system may be configured to obtain training images that are captured using a specific device. In some embodiments, the system may be configured to obtain training images captured using a specific type of imagine sensor. For example, the system may receive training images that are captured from a particular type of imaging sensor (e.g., a specific model). The obtained images may then represent images that will be captured by an imaging device employing the particular type of imaging sensor. Accordingly, the machine learning system may be optimized for performance for the particular type of imaging sensor.

In some embodiments, the set of training images may be selected to generalize images that would be received for enhancement by the trained machine learning system. The training set may include sets of images that vary for different imaging device settings. In some embodiments, the system may be configured to obtain a separate set of training images for different values of image device capture settings. In some embodiments, the system may be configured to obtain training images for different ISO settings of the imaging device to represent different light sensitivity levels of the imaging device. For example, the system may obtain training images for different ISO settings between 50 and 2000. A high ISO can be desirable in some applications because it can provide as much signal as possible, but a higher ISO may have additional noise. Therefore, different ISO settings may have different noise characteristics. As discussed further herein, one or more neural networks can be trained to handle ISO. For example, a different neural network can be trained for each ISO setting, or one neural network can be trained that covers a set of ISO settings, or some combination thereof.

After obtaining the set of training images, process 200 proceeds to act 204 where the system trains the machine learning system using the obtained training images. In some embodiments, the system may be configured to perform an automated supervised learning in which the inputs are the obtained dark images, and the corresponding outputs are the obtained light images corresponding to the dark images. In some embodiments, the system may be configured to perform the supervised learning to determine values of one or more parameters of the machine learning system.

In some embodiments, the machine learning system may include one or more neural networks that are to be trained to perform image enhancement. In some embodiments, the machine learning system may include one or more convolution neural networks (CNNs). A convolution neural network performs a series of convolution operations for a given input image. The convolution operations are performed using one or more filters at each layer. The values to be used in the filters are to be determined during the training process. In some embodiments, the CNN may further include one or more layers with nodes that multiple inputs from a previous layer by respective weights, and then sum the products together to generate a value. The value may then be fed into an activation function to generate a node output. The values in the filters, and/or the values of the coefficients of the convolution neural network may be learned during the training process.

In some embodiments, the system may be configured to train parameters of the machine learning system by optimizing a loss function. The loss function may specify a difference (e.g., error) between an output generated by the machine learning system, and a target output. For example, for a respective dark image, the loss function may specify a difference between the enhanced image generated by the machine learning system in response to input of a dark image, and the light image corresponding to the respective dark image in the training set. In some embodiments, the system may be configured to perform training to minimize the loss function for the obtained set of training images. Based on the value of a loss function calculated from an output of the machine learning system for an input dark image, the system may adjust one or more parameters of the machine learning system. In some embodiments, the system may be configured to use an optimization function to calculate adjustments to make to the parameter(s) of the machine learning system based on the value of a loss function. In some embodiments, the system may be configured to perform adjustments to parameters of the machine learning system until a threshold level of accuracy is reached for the testing images as indicted by the loss function. For example, the system may be configured to adjust the parameters during training until a minimum of the loss function is obtained for the training images. In some embodiments, the system may be configured to determine adjustments by a gradient descent algorithm. In some embodiments, the system may be configured to perform a batch gradient descent, stochastic gradient descent, and/or mini-batch gradient descent. In some embodiments, the system may be configured to use an adaptive learning rate in performing the gradient descent. For example, the system may be configured to use the RMSprop algorithm to implement the adaptive learning rate in the gradient descent.

In some embodiments, the system may be configured to use different and/or multiple loss functions. In some embodiments, the system may be configured to use a combination of multiple loss functions. For example, the system may be configured to use one or more of the mean absolute error (MAE), structure similarity (SSIM) index, color difference loss functions, and/or other loss functions (e.g., a loss function applied to bandpass images, as discussed in conjunction with FIG. 4). In some embodiments, the color difference may be calculated using Euclidean distance between pixels. In some embodiments, the color difference may be calculated using a delta-E 94 distance metric between pixels. Some embodiments are not limited to a particular color difference metric. In some embodiments, the system may be configured to apply the loss functions to one or more individual channels (e.g., red channel, green channel, blue channel).

In some embodiments, the system may be configured to apply the loss function to a filtered output of the machine learning system in order to optimize performance of the machine learning system for a particular range of frequencies as described in reference to FIG. 4 below.

In some embodiments, the system may be configured to use a linear combination of multiple loss functions. In some embodiments, the system may be configured to use a linear combination of MAE of one or more channels of the image, MAE of a filtered output, and SSIM. For example, the combination of multiple loss functions may be as shown in Equation 1 below.

$$\text{Error} = 1.6*\text{MAE of red channel} + 1.0*\text{MAE of green channel} + 1.6*\text{MAE of blue channel} + 1.4\text{SSIM} + 1.5*\text{frequency filtered MAE} \quad \text{Equation 1:}$$

In some embodiments, the system may be configured to set one or more hyper-parameters of the machine learning system. In some embodiments, the system may be configured to set values of the hyper-parameter(s) prior to initiating an automated training process. The hyper-parameters may include a number of layers in a neural network (also referred to herein as "network depth"), a kernel size of filters to be used by a CNN, a count of how many filters to use in a CNN, and/or stride length which specifies the size of steps to be taken in a convolution process. In some embodiments, the system may configure the machine learning system to employ batch normalization in which the outputs of each layer of the neural network are normalized prior to being input into a subsequent layer. For example, the outputs from a first layer may be normalized by subtracting a mean of the values generated at the first layer, and dividing each values by a standard deviation of the values. In some embodiments, the use of batch normalization may add trainable parameters to layers of a neural network. For example, the system may add a gamma and beta parameter that are used for normalization at each step. The machine learning system may subtract the beta value from each output of a layer, and then divide each output by the gamma value. In some embodiments, the neural network space can be compressed using quantization.

In some embodiments, the hyper-parameters of the machine learning system may be manually configured. In some embodiments, the hyper-parameters of the machine learning system may be automatically determined. For example, large scale computing techniques can be used to train models using different parameters, with the results stored into a shared storage. The shared storage can be queried to determine the best models, and in-turn to determine the best parameters (or range of values of parameters) in an automated fashion. In some embodiments, the system may be configured to store one or more values indicating performance associated with one or more hyper-parameter values. The system may be configured to automatically determine an adjustment to the hyper-parameter value(s) to improve performance of the system. In some embodiments, the system may be configured to store the value(s) indicating performance of the machine learning system when configured with respective hyper-parameter values in a database. The system may be configured to query the database for value(s) indicating performance of the machine learning system when configured with specific hyper-parameter values.

In some embodiments, the machine learning system may include a CNN. In some embodiments, the machine learning system may be configured to use a mix of depth-wise separable convolutions and full convolutions to reduce time required for the machine learning system to be trained, and to subsequently perform enhancement of images. In some embodiments, a mix of depth-wise separable convolutions and full convolutions may be used to reduce space required for the machine learning system. For example, to reduce the number of parameters of the machine learning system.

After training the machine learning system at block 204, process 200 proceeds to block 206 where the machine learning system is used for image enhancement. For example, the trained machine learning system may be used by image enhancement system 111 to perform enhancement of one or more received images. In some embodiments, the system 111 may be configured to obtain an image, and generate a corresponding light image according to the learned, and configured parameters of the machine learning system.

Figure 2B:
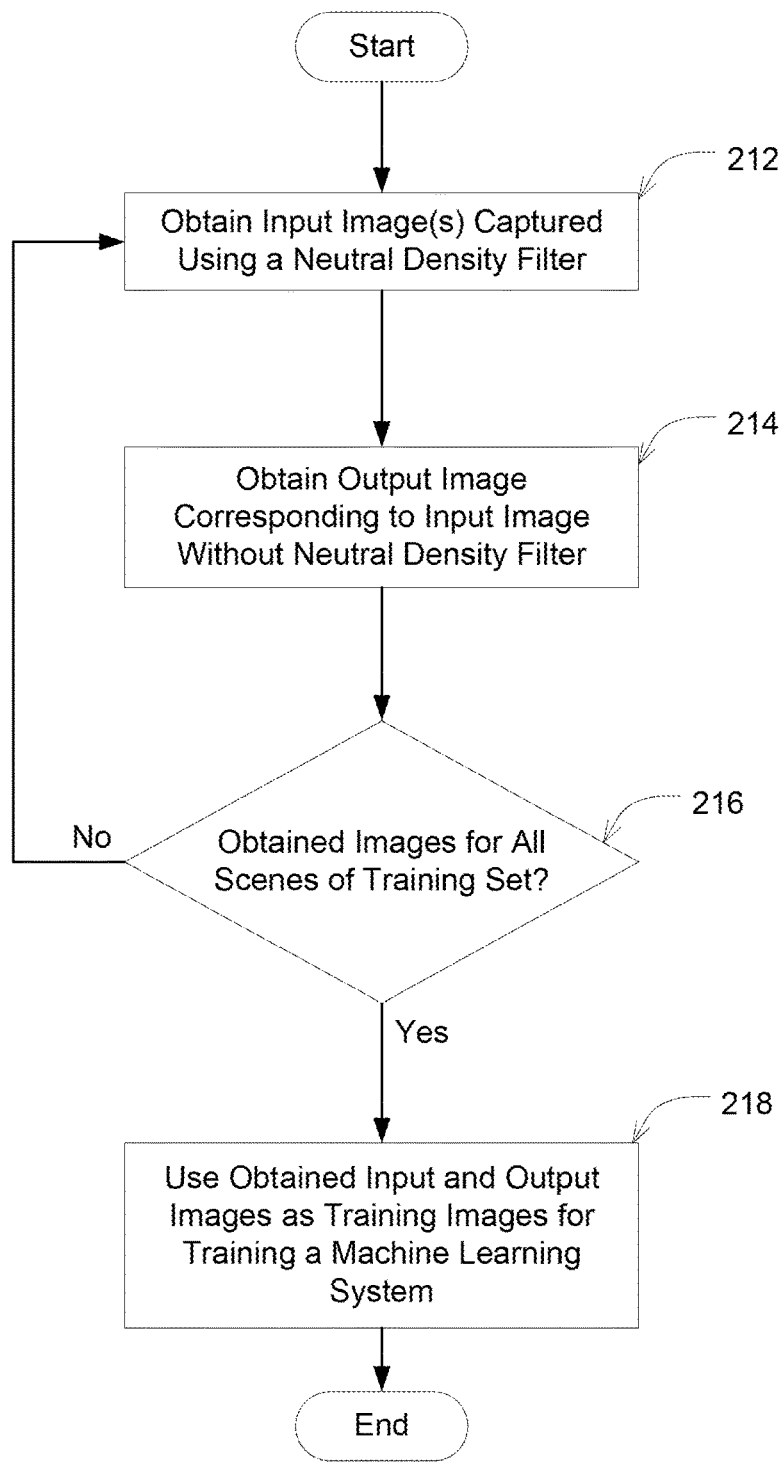
FIG. 2B shows an exemplary process for obtaining a set of training images, according to some embodiments.

FIG. 2B shows an exemplary process 210 for obtaining a set of training images, in accordance with some embodiments. Process 210 may be performed as part of process 200 described above with reference to FIG. 2. For example, process 210 may be performed to obtain a set of dark images and corresponding light images for a training set of images. Process 210 may be performed using any computing device (s) which include one or more hardware processors, as aspects of the technology are not limited in this respect.

Process 210 begins at act 212 where the system executing process 210 obtains one or more input images for the training set of images that were captured using a neutral density filter. The input image(s) may be dark image(s) that are to represent image(s) of a scene captured in low light conditions. In some embodiments, an imaging device (e.g., a digital camera) with an neutral density (ND) filter may be used to capture the image(s). In some embodiments, the system may receive the input image(s) captured by the imaging device. For example, the system may receive the input image(s) via a wireless transmission over a network (e.g., the Internet). In another example, the system may receive the input image(s) via a wired connection (e.g., USB) with the imaging device. In yet another example, the input image(s) may be received from another system (e.g., cloud storage) where the input image(s) captured by the imaging device are stored.

The ND filter may simulate low light conditions in which the image is captured as the ND filter reduces intensity of light that reaches an imaging sensor of an imaging device. The operation of the ND filter may be described by Equation 2 below:

$$I = I_0 * 10^{-d} \qquad \text{Equation 2:}$$

In Equation 2, $I_0$ is the intensity of light incident on the ND filter, d is a density of the ND filter, and I is the intensity of the light after passing through the ND filter. In some embodiments, the ND filter may comprise material that changes the intensity of light passing through it prior to reaching the imaging sensor. For example, the ND filter may be a darkened piece of glass or resin placed ahead of the imaging sensor in a path of light entering the imaging device such that light passes through the piece of glass or resin prior to reaching the imaging device. In some embodiments, the ND filter may be a variable ND filter that allows variation of the density of the filter. This allows for the ND filter to be adjusted to set an amount by which light intensity is to be reduced. In some embodiments, the ND filter may be an electronically controlled ND filter. The electronically controlled ND filter may provide a variable amount by which the ND filter reduces intensity of light prior to reaching the imaging sensor the imaging device based on a controlled electrical signal. For example, an electronically controlled ND filter may comprise a liquid crystal element which changes the amount by which light intensity is reduced based on application of a voltage. The voltage may be controlled by the imaging device.

In some embodiments, input image(s) may be obtained at block 212 using multiple different ND filter density settings to simulate varying levels of low light conditions. For example, multiples images of a scene may be captured using different density settings for the ND filter. In some embodiments, image(s) may be obtained using a single ND filter density setting.

In some embodiments, the input image(s) may be obtained using the ND filter at block 212 across different image capture settings of the imaging device. For example, input image(s) may be captured using the ND filter for different settings of exposure time, ISO settings, shutter speed, and/or aperture of the imaging device. Accordingly, a training set of images may reflect a broad range of imaging device configurations in which images may be captured.

After capturing the input image(s) at block 212, process 210 proceeds to block 214, where the system obtains one or more output images corresponding to the input image(s) obtained at block 212. An imaging device that was used to capture the input image(s) may be used to capture the output image(s) without an ND filter. Thus the output image(s) may represent enhanced versions of the input image(s). In some embodiments, the output image(s) may be captured across different image capture settings of the imaging device. For example, an output image may be captured for each imaging device configuration that was used for capturing the input image(s). Accordingly, the output image(s) in the training set may reflect a range of imaging device configurations in which images may be captured.

Next, process 210 proceeds to block 216, where the system determines if input image(s) and corresponding output image(s) for all scenes that are to be included in the training set of images have been captured. In some embodiments, the system may be configured to determine whether a threshold number of scenes have been captured. For example, the system may determine if a threshold number of scenes that provide adequate diversity for training the machine learning system have been captured. In some embodiments, the system may be configured to determine whether a sufficient diversity of scenes have been obtained. In some embodiments, the system may be configured to determine if images have been obtained for a sufficient diversity of number of objects in images of the training set. In some embodiments, the system may be configured to determine if images have been obtained for a sufficient diversity of colors in images of the training set.

If at block 216, the system determines that image(s) for all scenes of a training set of images have been obtained, then process 210 proceeds to block 218 where the system uses the obtained input and output images for training a machine learning system. The input and output images may be used to train one or more machine learning models of the machine learning system as described above with reference to FIG. 2A. For example, the obtained input and output images may be used by the system for training one or more neural networks that are used to enhance images by the image enhancement system 111 described above with reference to FIGS. 1A-B.

If at block 216, the system determines that the image(s) for all scenes of a training set of images have not been obtained, then process 210 proceeds to block 212 where the system obtains one or more image(s) for another scene. The system may then perform the steps at blocks 212-214 again to obtain another set of input image(s) and corresponding output image(s) of a scene to be added to the training set of images.

Figure 2C:
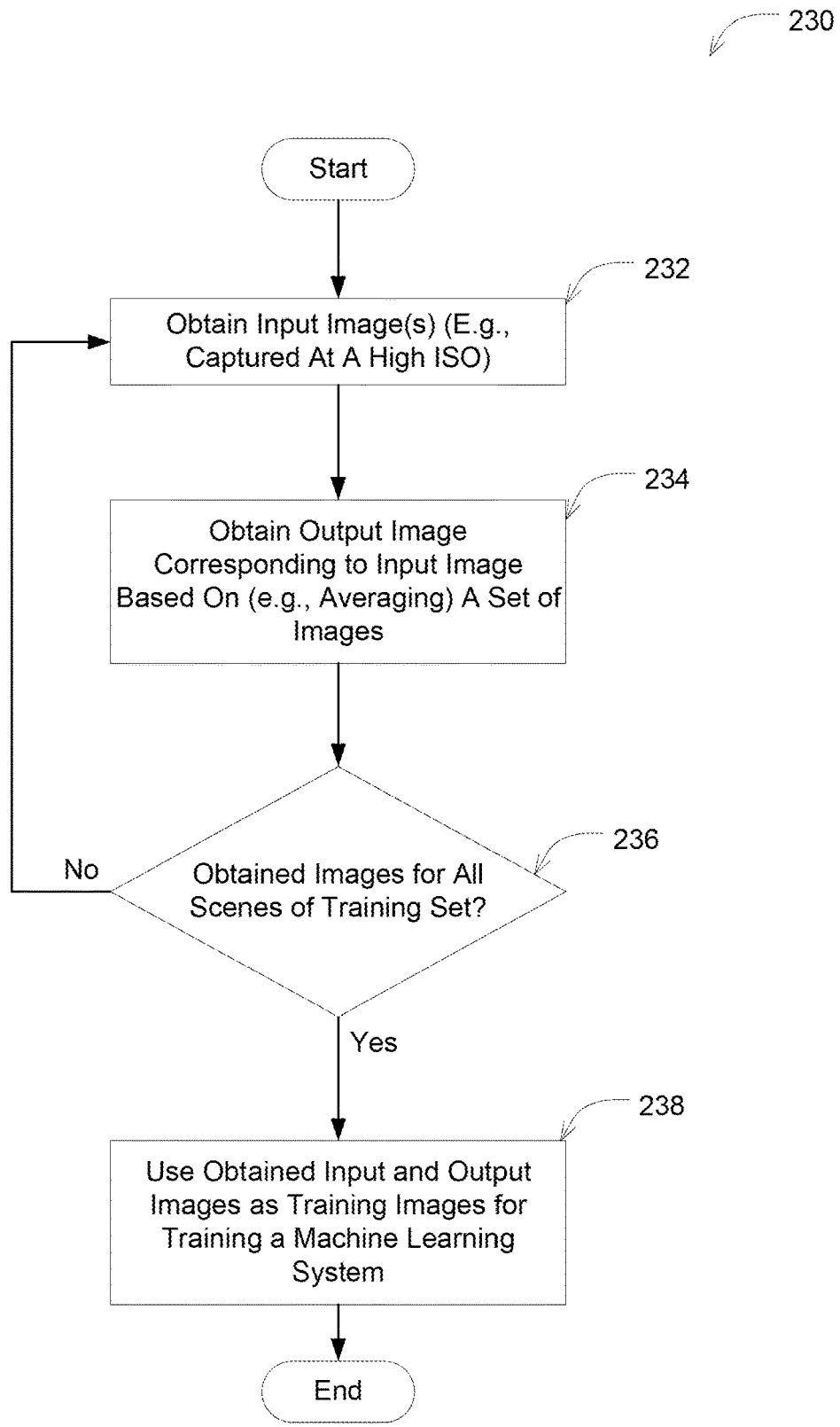
FIG. 2C shows another exemplary process for obtaining a set of training images, according to some embodiments.

FIG. 2C shows another exemplary process 230 for obtaining a set of training images, according to some embodiments. It should be appreciated that while processes 210 and 230 are described in conjunction with separate figures, the techniques of either and/or both processes can be used to obtain training images. For example, some embodiments may use the neutral density techniques described in conjunction with process 210, the averaging techniques described in conjunction with process 230, and/or other techniques to obtain training images, which can be used to train a machine learning system as described further herein. Like process 210, process 230 may be performed as part of process 200 described above with reference to FIG. 2. For example, process 230 may be performed to obtain a set of dark images and corresponding light images for a training set of images. Process 230 may be performed using any computing device(s) which include one or more hardware processors, as aspects of the technology are not limited in this respect.

Process 230 begins at act 232 where the system executing process 230 obtains one or more input images for the training set of images. In some embodiments, the input image can be a noisy image and/or a dark image taken using a normal exposure time (e.g., not a modified exposure time designed to increase and/or decrease noise and/or light in the scene). In some embodiments, the input images can be captured using a relatively high ISO value. A high ISO value can, for example, help improve and/or maximize the quantization accuracy of low-intensity pixel values in the digital sampling process. In some embodiments, the input images can be captured using an ISO of, for example, ranging between approximately 1,500-500,000 and/or other ISO values considered to be high ISO values (e.g., a high enough ISO value to cause the image to look brighter and can also increase noise in the image). In some embodiments, the ISO value can be above an ISO threshold, such as a threshold that ranges between approximately 1,500-500,000 and/or the like.

Process 230 proceeds from act 232 to act 234, and the system obtains, for each input image, a corresponding output image of the same scene captured by the input image. In some embodiments, the system can obtain the output image using a plurality of separately captured images (e.g., including the input image obtained in step 232 and/or separate images) and use the plurality of images to determine the output image. In some embodiments, the set of images used to determine the output image can be captured with the same and/or similar setting(s) (e.g., exposure time, ISO, etc.) used to capture the input images at act 232. In some embodiments, while acts 232 and 234 are shown as separate acts, the acts can be performed by capturing a single set of images. For example, the system can be configured to capture a number of images, and the system can choose any one of the captured images to be the input frame, and the output image can be generated based on the remaining images in the set and/or all images in the set (including the image selected as the input image).

In some embodiments, the system can be configured to use and/or capture a predetermined number of images to use to determine the corresponding output image. For example, the system can be configured to capture 50 images, 100 images, 1,000 images and/or the like. For example, the number of images captured can be a number at which point averaging in more images only provides small improvements to the signal-to-noise ratio. In some embodiments, the system may be configured to use different numbers of images.

In some embodiments, each image in the set of images can be captured using rest periods between successive captures to allow the imaging device to cool (e.g., to help mitigate and/or control the temperature of the imaging device while capturing the set of images used to determine the output image). For example, short exposures (e.g., the same used to capture the input image(s)) can be used to capture each of the images in the set of images, and a cooling interval (e.g., a rest period of 0.25 seconds, 0.5 seconds, 1 second, 2 seconds, etc.) can be used to help keep the noise properties of the imaging device consistent with those when capturing the input frames determined at act 232. Therefore, by using a set of images captured under the same settings used to capture the input images at act 232, output images can be generated that exhibit the same and/or similar noise properties.

In some embodiments, the system can determine the output image by averaging the intensities for each pixel across the multiple images. For example, in some embodiments the system can determine an arithmetic mean across the set of images at each pixel location. In some embodiments, other techniques can be used, such as determining a linear combination, and/or any other function that processes the set of images to generate an output image that resembles a de-noised version of the input image. In some embodiments, the output image is processed using de-noising post-processing techniques.

Next, process 230 proceeds to block 236, where the system determines if input image(s) and corresponding output image(s) for all scenes that are to be included in the training set of images have been captured. In some embodiments, as described in conjunction with process 210, the system may be configured to determine whether a threshold number of scenes have been captured.

If at block 236, the system determines that image(s) for all scenes of a training set of images have been obtained, then process 230 proceeds to block 238 where the system uses the obtained input and output images for training a machine learning system. The input and output images may be used to train one or more machine learning models of the machine learning system as described above with reference to FIG. 2A. For example, the obtained input and output images may be used by the system for training one or more neural networks that are used to enhance images by the image enhancement system 111 described above with reference to FIGS. 1A-B. By determining the output images based on a set of images (e.g., by averaging short exposures that are taken with cooling intervals between captures, as described herein), the techniques can enable the machine learning system to learn a simpler transformation function (e.g., compared to using output images that exhibit different noise characteristics than the input images), can allows for a more compressible machine learning model, and/or the like.

If at block 236, the system determines that the image(s) for all scenes of a training set of images have not been obtained, then process 230 proceeds to block 232 where the system obtains one or more image(s) for another scene. The system may then perform the steps at blocks 232-234 again to obtain another set of input image(s) and corresponding output image(s) of a scene to be added to the training set of images.

Figure 3A:
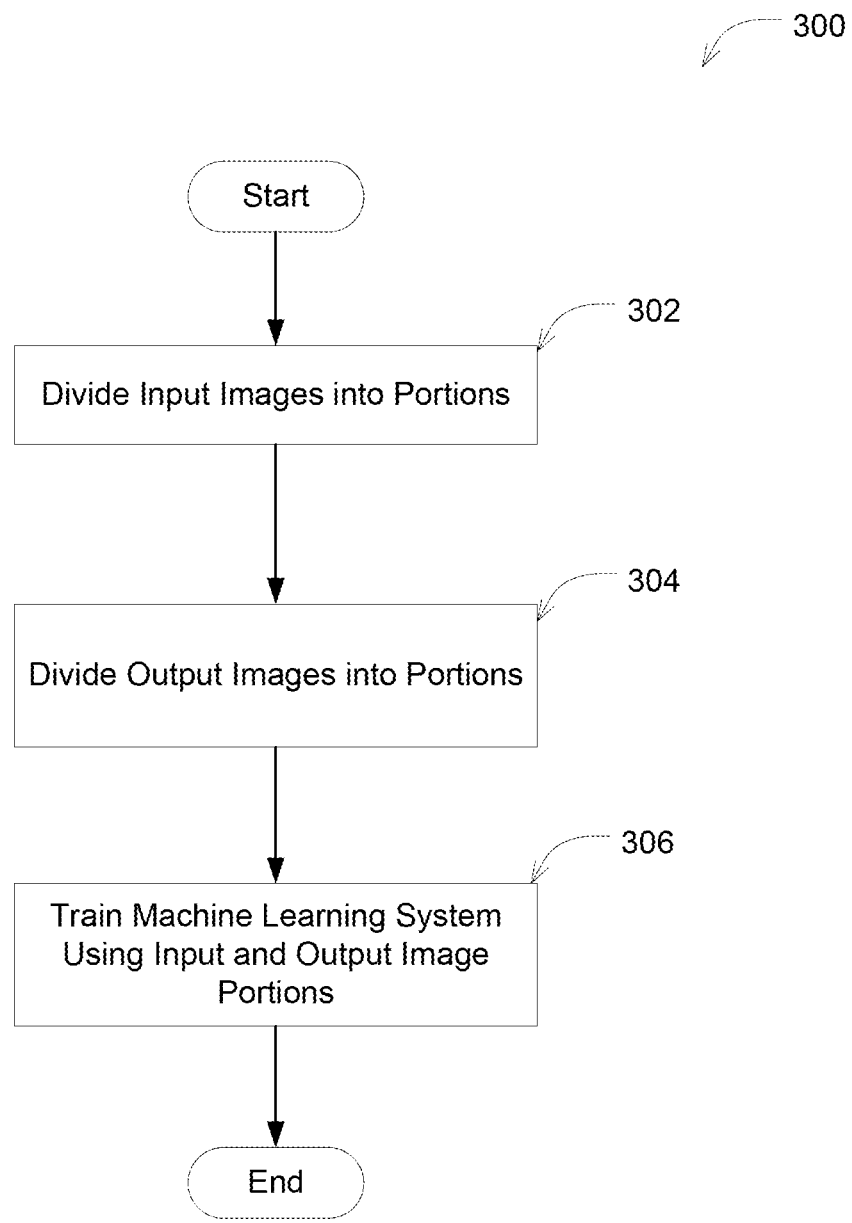
FIG. 3A shows a process for training a machine learning system using portions of input and output images, according to some embodiments.

FIG. 3A shows a process 300 for training a machine learning system using portions of input and output images, in accordance with some embodiments. Process 300 may be performed as part of process 200 described above with reference to FIG. 2. For example, process 300 may be performed as part of training a machine learning system that is to be used by image enhancement system 111 to enhance images captured in low light conditions. Process 300 may be performed using any computing device(s) which include one or more hardware processors, as aspects of the technology are not limited in this respect.

The inventors have recognized that a machine learning system may be made faster (e.g., the processing speed at which the system converts "dark" images to "light" images) if the size of the input to the machine learning system is reduced. With a smaller input size, the machine learning system may have fewer parameters, and fewer operations to perform, and thus can be executed more quickly. A smaller input size may also reduce the training time required to train one or more parameters of the machine learning system. With a smaller input size, the machine learning system may have fewer parameters for which values need to be learned. This in turn reduces the number of computations to be performed by a system during training. Accordingly, a smaller input to the machine learning system allows a system to train the machine learning system more efficiently.

Process 300 begins at block 302 where the system performing process 300 divides each of the input images in the training set into multiple image portions. The input images may be, for example, raw, high resolution images. In some embodiments, the system may be configured to divide a respective input image into a grid of equally sized portions. As a simple, illustrative example not intended to be limiting, an input image of size 500×500 may be divided into a grid of 100×100 image portions. In some embodiments, the system may be configured to dynamically determine a size of the image portions that an input image is to be divided up into. For example, the system may be configured to analyze the image to identify objects in the image. The system may determine a size of the image portions that ensure that image portions include complete objects. In some embodiments, the system may be configured to determine a size of the image portions to minimize training time, and or time required for image enhancement. For example, the system may determine a size of the image portions based on an expected time for training a machine learning system that is to process inputs of the size of the image portion. In another example, the system may determine a size of the image portions based on an expected time to process an input having the size when the machine learning system is used to perform image enhancement. In some embodiments, the system may be configured to divide up all the input images into portions of the same size. In some embodiments, the system may be configured to divide input images into portions of different sizes.

Next, process 300 proceeds to block 304 where the system divides the corresponding output images into image portions. In some embodiment, the system may be configured to divide up the output images into portions in the same manner as corresponding input images were divided up. For example, if a 500×500 input image was divided in to 100×100 image portions, the corresponding output image in the training set may also be divided into 100×100 image portions.

Next, process 300 proceeds to block 306, where the system uses the input image portions and output image portions for training the machine learning system. In some embodiments, the system may be configured to use the input image portions and output image portions as individual inputs and corresponding outputs for performing supervised learning for training the machine learning system. In some embodiments, the input image portions may form the set of dark images, and the output image portions may form the set of corresponding light images according to which the machine learning system is trained.

Figure 3B:
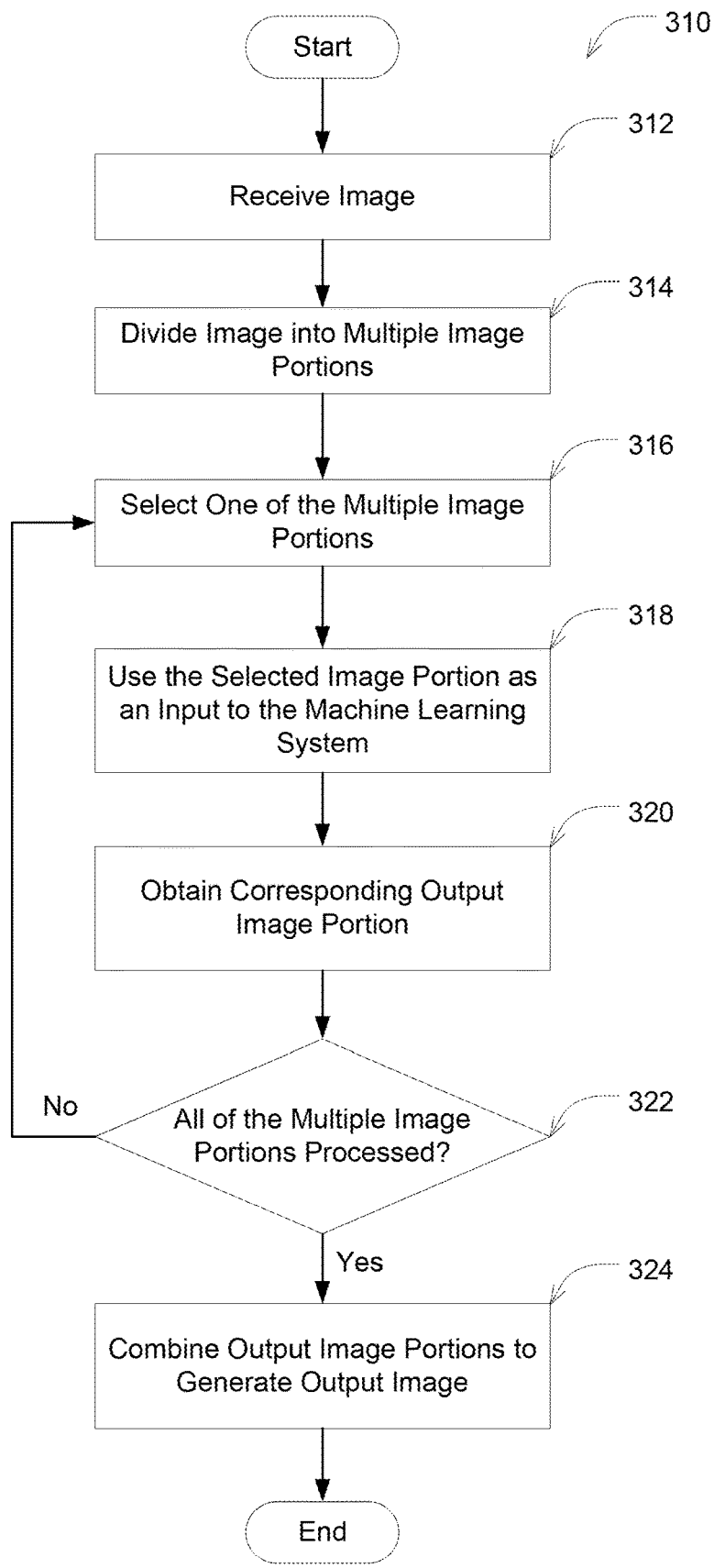
FIG. 3B shows a process for enhancing an image by dividing the image up into portions, according to some embodiments.

FIG. 3B shows a process 310 for enhancing an image by dividing the image up into portions, in accordance with some embodiments. Process 310 may be performed as part of enhancing an image. For example, process 310 may be performed by image enhancement system 111 as part of enhancing an image obtained from an imaging device. Process 310 may be performed using any computing device (s) which include one or more hardware processors, as aspects of the technology are not limited in this respect.

Process 310 begins at block 312 where the system executing process 310 receives an input image. In some embodiments, the system may obtain an image captured by an imagine device (e.g., a digital camera). For example, the system may receive the image from the imaging device. In another example, the system may be executed as part of an application on the imaging device, and access the image captured by the imaging device from a storage of the imaging device. In yet another example, the system may obtain the captured image from another system separate from the imaging device (e.g., cloud storage).

Next, process 310 proceeds to block 314 where the system divides the image into multiple image portions. In some embodiments, the system may be configured to divide the image into the same sized input portions that input images in a training set of images were divided into when training the machine learning system. In some embodiments, the system may be configured to divide the image into multiple equally sized portions. In some embodiments, the system may be configured to analyze the image to determine a size of portions, and then divide the image into portions having the determined size. For example, the system may be configured to identify one or more objects in the image, and determine a size of the image portions based on the identification of the object(s). In some embodiments, the system may be configured to determine sizes of the image portions to mitigate the effects of contrast changes in the portions. For example, if a 100×100 sized image portion has objects between which there is a large contrast, the image portion may be expanded to reduce the impact of the contrast differences in the image portion.

Next, process 310 proceeds to block 316 where the system selects one of the multiple image portions obtained at block 314. In some embodiments, the system may be configured to select one of the image portions randomly. In some embodiments, the system may be configured to select one of the image portions in sequence based on a position of the image portion in the original image. For example, the system may select image portions starting from a specific point in the image (e.g., a specific pixel position).

Next, process 310 proceeds to block 318 where the system uses the selected image portion as an input to a machine learning system. In some embodiments, the machine learning system may be a trained machine learning system for performing image enhancement for images captured in low light conditions. For example, the machine learning system may be trained machine learning system 112 described above with reference to FIGS. 1A-B and trained according to process 200 described with reference to FIG. 2. The machine learning system may include one or more models (e.g., neural network models) for which the selected image portion may be used as an input. The system may input the selected image portion into a machine learning model.

Next, process 310 proceeds to block 320 where the system obtains a corresponding output image portion. In some embodiments, the system may obtain an output of the machine learning system. For example, the system may obtain an output of a trained neural network model into which the image portion was inputted. The output of the machine learning system may be an enhanced version of the input image portion. For example, the input image portion may have been taken in low light conditions. As a result, one or more objects in the image portion may not be visible, may be blurry, or the image portion may have poor contrast. The corresponding output image may have increased illumination such that the object(s) are visible, clear, and the image portion has improved contrast.

Next, process 310 proceeds to block 322 where the system determines whether all of the image portions that the originally received image was divided up into have been processed. For example, if the original image had a size of 500×500 and was divided into 100×100 image portions, the system may determine whether each of the 100×100 image portions has been processed. The system may determine if each of the 100×100 image portions has been inputted into the machine learning system, and whether a corresponding output portion has been obtained for each input portion.

If, at block 322, the system determines that there are portions of the received image that have not been processed, then process 310 proceeds to block 316 where the system selects another image portion, and processes the image portion as described above in reference to blocks 318-320. If, at block 322, the system determines that all the image portions have been processed, then process 310 proceeds to block 324 where the system combines the obtained output image portions to generate an output image. In some embodiments, the system may be configured to combine output image portions generated from outputs of the machine learning system to obtain the output image. For example, if the original image was a 500×500 image that was divided into 100×100 portions, the system may combine outputs from the machine learning system of 100×100 images. The system may be configured to position each of the 100×100 output image portions in a position of the corresponding input image portion in the originally obtained image to obtain the output image. The output image may be an enhanced version of the image obtained at block 312. For example, the original image may have been captured by the imaging device in low light conditions. The obtained output image may be an enhanced version of the captured image that improves a display of a scene captured in the original image (e.g., improved contrast and/or reduced blurring).

As described above with reference to FIG. 2A, in some embodiments, the machine learning system may be configured to perform one or more convolution operations on an image portion that is input into the machine learning system. A convolution operation may be performed between a filter kernel and pixel values of the input image portion. The convolution operation may involve determining values of a corresponding convolution output by taking a linear combination of pixel values that surround a pixel position in the image portion for which convolution is being performed. For example, if the filter kernel is a 3×3 matrix, the convolution operation may involve multiplying pixel values of pixels in a 3×3 matrix around a respective pixel position by weights in the kernel, and summing them to obtain a value for the respective pixel position in the output of the convolution operation. One problem that occurs in performing convolution operations is that pixel positions at the edge of an image portion may not have pixels surrounding a respective pixel position on all sides of the position. For example, for a convolution operation with a 3×3 kernel matrix, a pixel position on the left edge of an image portion will not have any pixels to its left with which the kernel can be convolved. To address this, conventional systems may pad the image portion with 0 value pixels. This, however, may cause distortions on the edge of the image portion as the 0 value pixels do not represent information from the image captured by the imaging device.

Figure 3C:
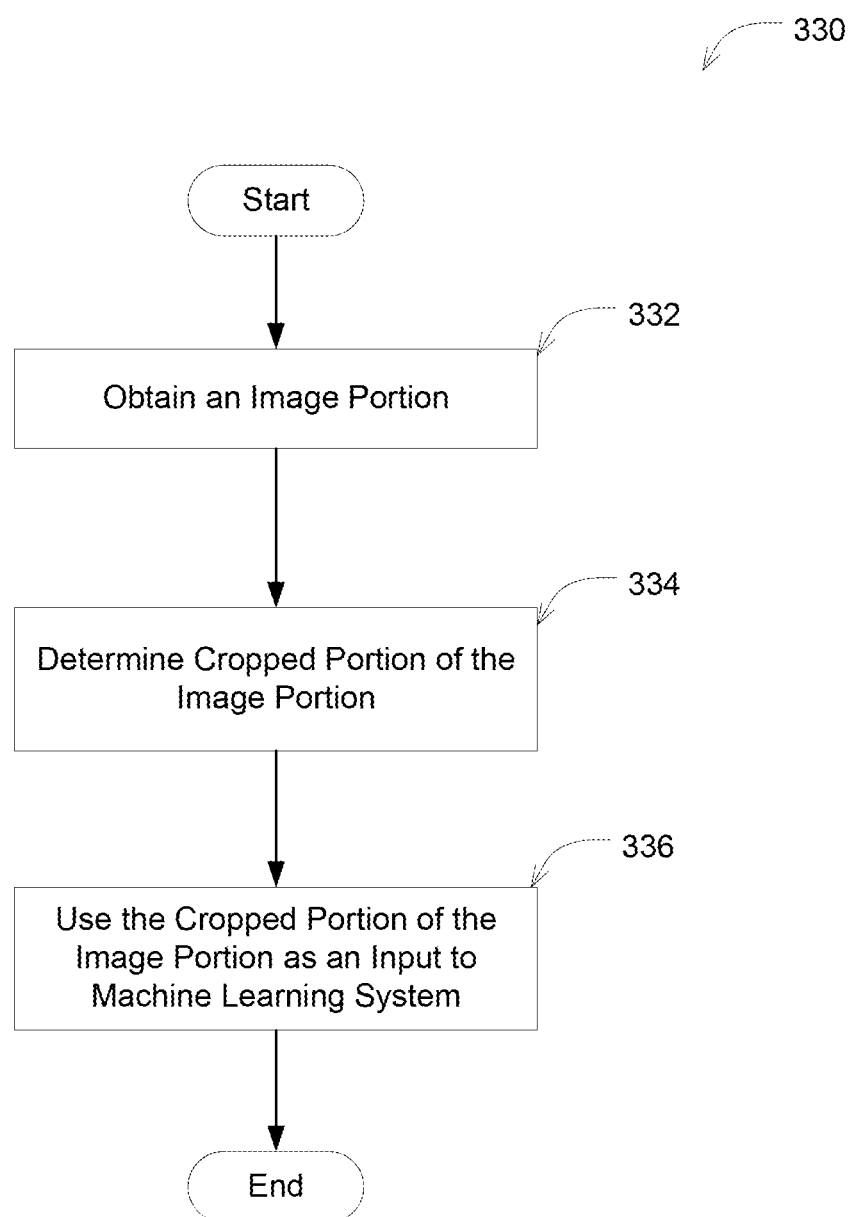
FIG. 3C shows a process for mitigating edge distortion in filtering operations performed by a machine learning system, according to some embodiments.

FIG. 3C shows a process 330 for mitigating the above-described problem of edge distortion during a filtering operation performed by a machine learning system, in accordance with some embodiments. Process 330 may be performed during training of the machine learning system and/or image enhancement. For example, process 330 may be performed as part of training a machine learning system that is to be used by image enhancement system 111 to enhance images captured in low light conditions, and subsequently performed by enhancement system 111 during image enhancement. Process 330 may be performed using any computing device(s) which include one or more hardware processors, as aspects of the technology are not limited in this respect.

Process 330 begins at block 332 where the system performing process 330 obtains an image portion. The image portion may be obtained as described above with in processes 300 and 310 with references to FIGS. 3A-B.

Next, process 330 proceeds to block 334 where the system determines a cropped portion of the image portion. In some embodiments, the system may determine a cropped portion of the image portion that has a number of pixels around the edge of the cropped portion. For example, if the image portion is a 100×100 image, the system may determine a cropped portion of the image portion that is a 98×98 image in the center of the 100×100 image. Thus the cropped portion of the image portion has pixels surrounding the edge of the image portion. This may ensure that pixels at the edge of the cropped portion have surrounding pixels for convolution operations.

Next, process 330 proceeds to block 336 where the system uses the cropped portion of the image portion as an input to the machine learning system. In some embodiments, the system may be configured to pass the entire original image portion as input, but apply filter operations (e.g., convolution) to the cropped portion of the image portion. This may eliminate the distortion at edges of the enhanced output image portion that is generated from an output of the machine learning system. For example, if a convolution operation is performed with a 3×3 filter kernel on a 98×98 cropped portion of a 100×100 image portion, convolution performed on the pixels at the edge of the 98×98 cropped portion will have pixels that align with each of the positions in the 3×3 filter kernel. This may reduce edge distortions compared to conventional techniques such as padding the image portion with 0 valued pixels.

In some embodiments, the system may determine image portion sizes that incorporate additional pixels to account for a subsequent cropping operation that is to be performed by the system (e.g., the system may crop an enhanced portion of an image prior to stitching the resulting processed portions together to create the full enhanced image). For example, the system may be configured to obtain image portions with sizes of 102×102, as the system may subsequently perform filtering operations on cropped 100×100 portions of the image portions. By removing the additional pixels during the filtering operation, the cropped portions may be free of the edge effects discussed above.

Figure 4:
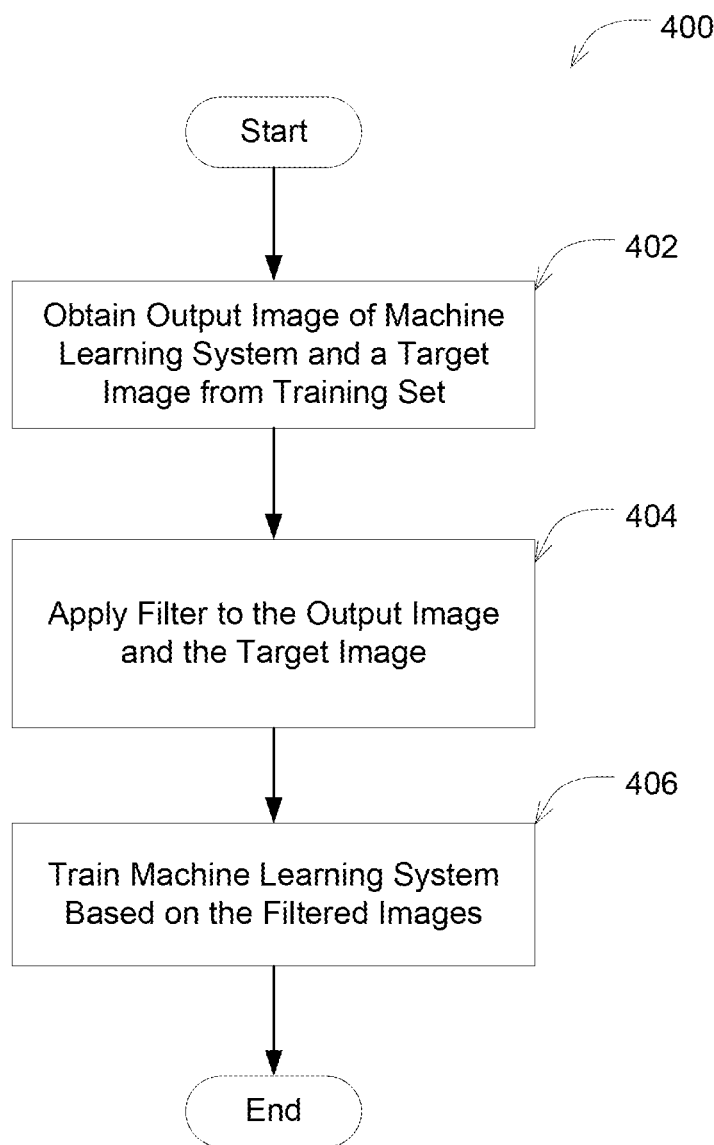
FIG. 4 shows a process for training a machine learning system, according to some embodiments.

FIG. 4 shows a process 400 for training a machine learning system, in accordance with some embodiments. Process 400 may be performed to optimize the machine learning system for a particular frequency range in an image. For example, for ensuring that the machine learning system performs best in a frequency range that is perceivable by humans. Process 400 may be performed as part of training a machine learning system to be used for performing image enhancement (e.g., as part of process 200 described above with reference to FIG. 2A). Process 400 may be performed using any computing device(s) which include one or more hardware processors, as aspects of the technology are not limited in this respect.

Process 400 begins at block 402 where the system performing process 400 obtains a target image from a training set of images that is being used to train a machine learning system, and a corresponding output image generated by the machine learning system. The target image may be a light image that represents a target enhanced output of a corresponding dark image according to which the machine learning system is trained. The output image generated by the machine learning system may be the actual output image generated by the machine learning system during training of the machine learning system.

Next, process 400 proceeds to block 404 where the system applies a filter to the output image and the target image. In some embodiments, the system may apply a frequency filter to the output image and the target image to obtain a filtered target image and a filtered output image that each include one or more particular ranges of frequencies. In some embodiments, the filter may comprise a bandpass filter which passes frequencies in a certain range, and attenuates frequencies outside of the range. In some embodiments, the frequency range may be a range of frequencies that are perceptible by humans. For example, the bandpass filter may pass frequencies in a range of 430 THz to 770 THz.

In some embodiments, to apply the filter to a respective one of the output image or the target image, the system may transform the respective image into the frequency domain. For example, the system may Fourier transform the respective image to obtain a corresponding image in the frequency domain. The filter may be defined as a function in the frequency domain. To apply the filter to the transformed image, the system may be configured to multiply the filter function by the Fourier transformed image to obtained a filtered output. The system may then inverse Fourier transform the result of the filtered output to obtain the filtered image.

Next, process 400 proceeds to block 406 where the system trains the machine learning system based on the filtered target image and output image. During training, the actual image outputted by the machine learning system may be compared to the target image from the training set to determine performance of the machine learning system. For example, the system may determine an error between the target image and the output image according to one or more error metrics. The result of the error metric may be used to determine an adjustment to make to one or more parameters of the machine learning system during training. At block 406, the system may determine an error between the output image and the target image based on a difference between the corresponding filtered output image and filtered target image. In some embodiments, the system may be configured to determine a value of one or more error metrics based on the filtered images. In some embodiments, the system may be configured to determine a channel-wise mean absolute error (MAE) between the filtered output image and the filtered target image. In some embodiments, the system may be configured to determine a root mean squared error (RMSE) between the filtered images. Some embodiments may additionally or alternatively use one or more other error metrics. The system may then determine an adjustment to the parameter(s) of the machine learning system based on the determined error. For example, the system may be configured to determine an adjustment using the determined error in a gradient descent algorithm which the system is executing to train the machine learning system.

By training the machine learning system based on an error between the filtered target image and filtered output image, the system may optimize performance of the machine learning system for a particular range of frequencies. In some embodiments, the system may be configured to optimize the machine learning system for a range of frequencies that are perceivable by humans. For example, the machine learning system may be trained to enhance images more accurately for light waves or frequencies that are perceivable by humans.

Figure 5:
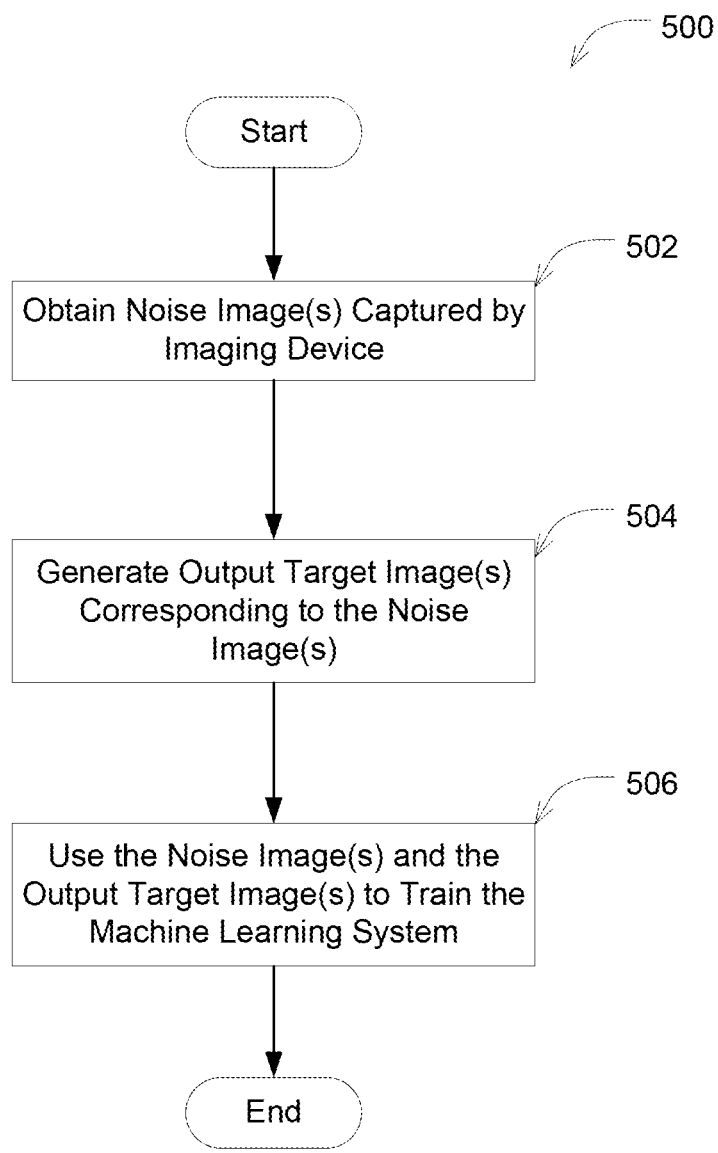
FIG. 5 shows a process for generating images of a training set of images for training a machine learning system, according to some embodiments.

FIG. 5 shows a process 500 for generating images of a training set of images for training a machine learning system, in accordance with some embodiments. Process 500 may be performed to reduce the effect of noise from components of an imaging device on performance of the machine learning system. Process 500 may be performed as part of training a machine learning system to be used for performing image enhancement (e.g., as part of process 200 described above with reference to FIG. 2A). Process 500 may be performed using any computing device(s) which include one or more hardware processors, as aspects of the technology are not limited in this respect.

Process 500 begins at block 502 where the system performing process 500 obtains one or more noise images corresponding to the imaging device. The noise image(s) may characterize noise generated by components of the imaging device. For example, noise in images may be caused by random variation in electric circuitry of the imaging device. In some embodiments, the noise image(s) may be image(s) captured by the imaging device at near zero exposure. The pixel values in the image(s) captured at near zero exposure may be caused by noise generated by the imaging device. In some embodiments, a near zero exposure image may be captured by using an ISO setting of 1000, 1050, 1100, 1150, 1200, 1250, 1300, 1350, 1400, 1450, and/or 1500. In some embodiments, a near zero exposure image may be captured by using an exposure time of 50, 51, 52, 53, 54, 55, 56, 57, 58, 59, 60, 61, 62, 63, 64, 65, 66, 67, 68, 69, or 70 ms. In some embodiments, a near zero exposure image may be captured using an exposure time of less than 50 ms, 55 ms, 60 ms, 65 ms, 70 ms, 75 ms, or 80 ms. In some embodiments, a near zero exposure image may be captured by preventing light from entering the lends. In some embodiments, a near zero exposure image may be captured using a combination of techniques described herein.

In some embodiments, the system may be configured to obtain one or more noise images that corresponds to specific settings of the imaging device. In some embodiments, the noise image(s) may correspond to particular ISO settings of the imaging device. The noise image(s) may be captured by the imaging device when configured with the particular ISO settings. In this manner, the system may include images in the training set that may generalize the machine learning system for various different ISO settings such that the machine learning system is able to perform accurately for different ISO settings.

Next, process 500 proceeds to block 504 where the system generates one or more output target images corresponding to the noise image(s). The target image(s) may be image(s) that represent how the machine learning system is to treat noise in images that are input to the machine learning system for enhancement. In some embodiments, the system may be configured to generate the target output image(s) as an image with all pixels having a value of 0. This may subsequently train the machine learning system to eliminate effects of sensor noise detected in images that are processed for enhancement.

Next, process 500 proceeds to block 506 where the system uses the noise image(s) and the corresponding output target image(s) to train the machine learning system. In some embodiments, the system may be configured to use the input image(s) and the output target image(s) as part of a training set of images for training the machine learning system in a supervised learning scheme. In some embodiments, the system may train the machine learning system to neutralize effects of noise that exists in images processed by the machine learning system for enhancement.

In some embodiments, the system may be configured to combine a noise image with one or more input images of the training set. In some embodiments, the system may be configured to combine the noise image with the input image(s) of the training set by concatenating the noise image with the input image(s). The system may concatenate the noise image by appending the noise image pixel values as separate channels of the input image(s). For example, the input image(s) may have one red, two green, and one blue channel. The noise image may also have one red, two green, and one blue channel. The channels of the noise image may be appended as additional channels thus giving the input image(s) a total of eight channels (i.e., the original one red, two green, and one blue channel along with the appended one red, two green, and one blue channels of the noise image). In some embodiments, the channels of the noise image may be different than those of the input image(s).

In some embodiments, the system may be configured combine the noise image with one or more input images of a training set by combining pixel values of the input image (s) with those of the noise image. For example, the pixel values of the noise image may be added to or subtracted from those of the input image(s). In another example, the pixel values of the noise image may be weighted and then combined with the pixel values of the input image(s).

Figure 6:
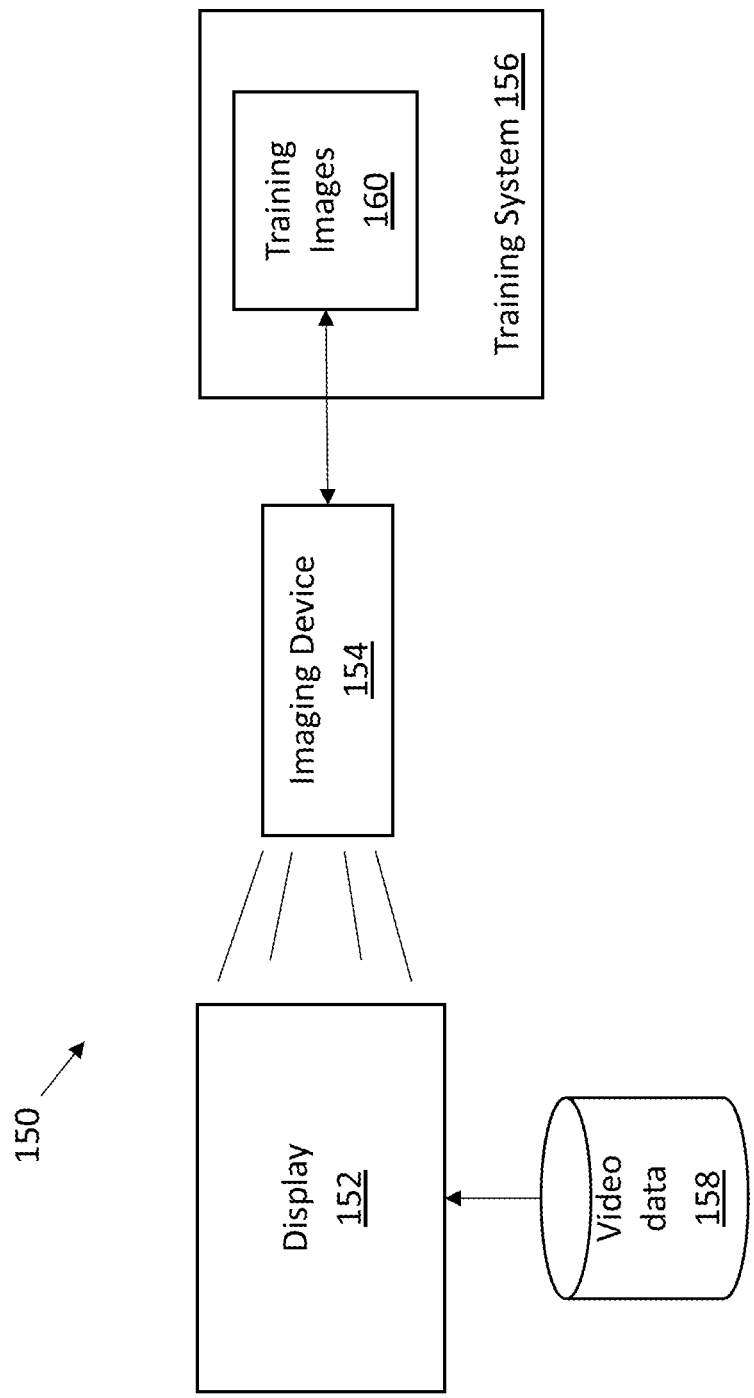
FIG. 6 shows an example system in which aspects of the technology described herein may be implemented, in accordance with some embodiments of the technology described herein.

FIG. 6 shows an example system 150 in which aspects of the technology described herein may be implemented, in accordance with some embodiments of the technology described herein. The system 150 includes a display 152, an imaging device 154, and a training system 156. The display 152 is used to display frames of the video data 158. The imaging device 154 is configured to capture images of video frames displayed by the display 152. The imaging device 154 can be any imaging device, such as the stand-alone digital camera 114A or the digital camera of a smart phone 114B as discussed in conjunction with FIG. 1A. The training system 156 may be, for example, the training system 110 shown in FIG. 1A, and can generate training images 160 that are used to train a machine learning model as described in conjunction with the training system 110. The video data 158 may be provided to the display 152 through a set top box, through a video playback device (e.g., a computer, a DVD player, a video recorder with playback capabilities, and/or the like), through a computing device (e.g., the training system 156 and/or a separate computing device), and/or the like.

The display 152 can be any light projection mechanism capable of displaying video frames. For example, the display 152 can be a television (TV) and/or smart TV, such as a light-emitting diode (LED) TV, an organic LED (OLED) TV, a liquid crystal display (LCD) TV with quantum dots (QLED), a plasma TV, a cathode ray tube (CRT) TV, and/or any other type of TV. In some embodiments, high resolution TVs can be used, such as HD TVs, 4K TVs, 8K TVs, and so on. As another example, the display 152 can be a projector, such as a projector that projects light onto a projector screen, wall, and/or other area.

The imaging device 154 can be configured to capture the input images and target images. For example, the imaging device may capture dark input images to simulate low light conditions. In some embodiments, the images of the reference object may be captured with exposure times that simulate low light conditions. For example, the images of the reference object may be captured with an exposure time of approximately 1 ms, 10 ms, 20 ms, 30 ms, 40 ms, 50 ms, 60 ms, 70 ms, 80 ms, 90 ms, or 100 ms. In some embodiments, the images of the reference object may be captured with exposure times that simulate bright light conditions. For example, the images of the reference object may be captured with an exposure time of approximately 1 minute, 2 minutes, or 10 minutes.

In some embodiments, the video data 158 can capture the scene under low light conditions and/or bright conditions. For example, in some embodiments, the video data can capture a video of the scene in low light conditions. For example, the video may capture the scene with a light source which provides an illumination of less than 50 lux. As another example, the video data can capture the bright target images by capturing one or more videos of one or more scenes with a threshold amount of lighting (e.g., with a light source of at least 200 lux), and using the frames of the captured video(s) as the target images. In some embodiments, the videos can be videos taken for another purpose other than for generating training data, and can be processed using the techniques described herein to generate the input and target image pairs.

In some embodiments, the video data 158 can be compressed and/or uncompressed video data. For example, in some embodiments uncompressed video data can be used to avoid using data that may include one or more compression artifacts (e.g., blocking, etc.). In some embodiments, compressed video can be used, such as by using keyframes and/or I-frames in the compressed video.

Figure 7:
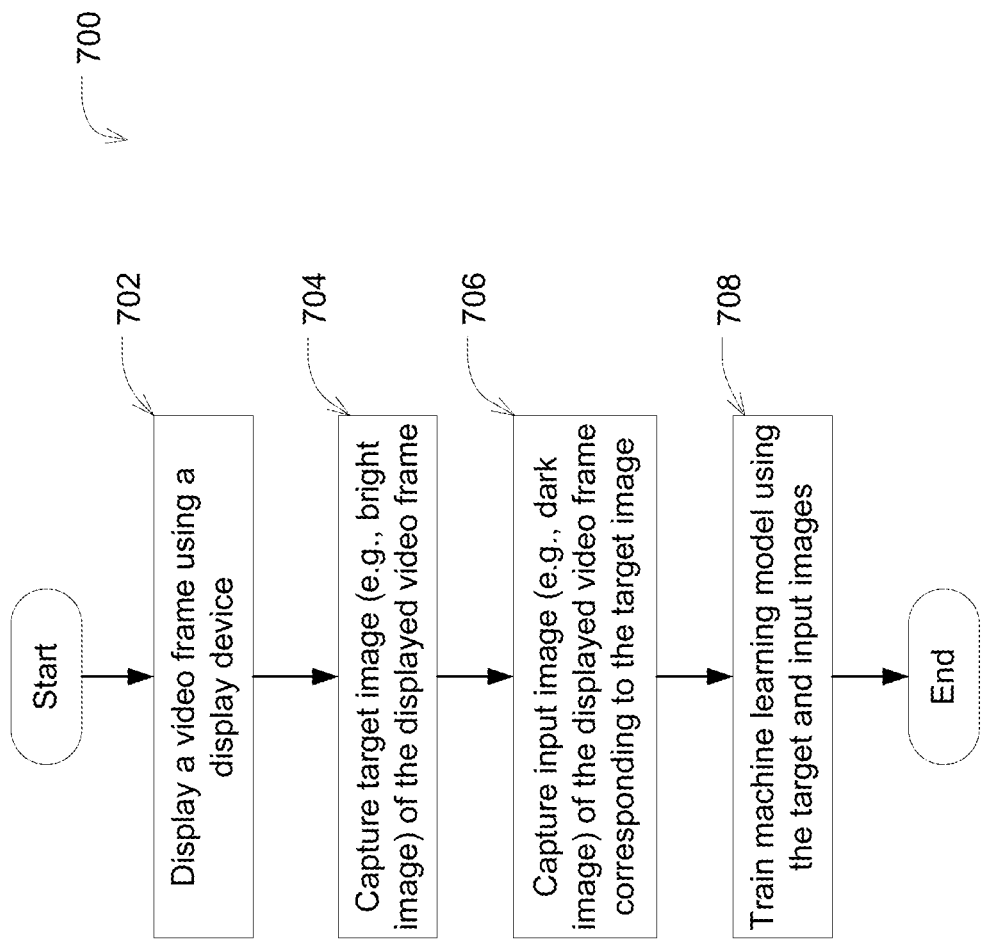
FIG. 7 shows a flow chart of an exemplary process for controlled generation of training data, according to some embodiments of the technology described herein.

FIG. 7 shows a flow chart of an exemplary process 700 for controlled generation of training data, according to some embodiments of the technology described herein. The method 700 starts at step 702, where a display device (e.g., display 152 in FIG. 6) displays a video frame of video data (e.g., the video data 158 in FIG. 6). The method 700 proceeds to step 704, and an imaging device (e.g., imaging device 154 in FIG. 6) captures a target image (e.g., a bright image) of the displayed video frame, which represents a target output of the machine learning model that will be trained by the training system 156. The method 700 proceeds to step 706, and the imaging device captures an input image (e.g., a dark image) of the displayed video frame, which corresponds to the captured target image and represents an input to the machine learning model that will be trained by the training system 156. While steps 704 and 706 are shown in a particular order in the method 700, this is for exemplary purposes only, as any order can be used to capture the input and target images (e.g., the input image can be captured prior to the target image, the input image and target image can be captured at a same time using the same and/or a plurality of imaging devices, etc.).

The method 700 proceeds to step 708, and a computing device (e.g., the training system 156 shown in FIG. 6) accesses the target image and the input image and trains the machine learning model using the target image and the input image to obtain a trained machine learning model. In some embodiments, the system may be configured to: (1) use the input images captured at block 706 as inputs of a training data set; (2) use the target images captured at block 704 as target outputs of the training data set; and (3) apply a supervised learning algorithm to the training data. A target image corresponding to a respective input image may represent a target enhanced version of the input image that the trained machine learning model is to output.

After training the machine learning model at block 708, process 700 ends. In some embodiments, the system may be configured to store the trained machine learning model. The system may store value(s) of one or more trained parameters of the machine learning model. As an example, the machine learning model may include one or more neural networks and the system may store values of trained weights of the neural network(s). As another example, the machine learning model include a convolutional neural network and the system may store one or more trained filters of the convolutional neural network. In some embodiments, the system may be configured to store the trained machine learning model (e.g., in image enhancement system 111) for use in enhancing images (e.g., captured in low light conditions by an imaging device).

As shown by the dotted arrow in FIG. 7 from step 706 to step 702, a plurality of target images and corresponding input images can be captured of different frames of the video. It can be desirable to capture a plurality of target images and input images, including from the same video and/or from a plurality of videos, to build the training set. Therefore, in some embodiments, the techniques can capture target and input images of a plurality of and/or all of the frames of a video, and/or can capture target and input images of frames of a plurality of videos.

In some embodiments, the techniques can be implemented in a controlled room or environment, such that the only light in the room is the light generated by the display device. In some embodiments, the imaging device can be configured to capture the light emitted from the display device (e.g., the light emitted from a TV). In some embodiments, the imaging device can be configured to capture light reflected from a surface, such as light projected from a projector onto a projector screen or other surface.

In some embodiments, the imaging device can be configured to capture the target and input images based on the frame rate of the display device. For example, the display may have different frame rates, such as 60 Hz, 120 Hz, and/or the like. If not compensated for, the imaging device may capture the image in a manner that causes aliasing. For example, when using a rolling shutter, at some frame rates the rolling shutter may interact with the TV frame rates such that it results in aliasing (e.g., a frame rate that satisfies the Nyquist frequency). The techniques can include capturing an image at a sampling rate that avoids an aliasing effect.

In some embodiments, the system may be configured to use input-target images captured by a particular image capture technology such that the machine learning model may be trained to enhance images captured by the image capture technology (e.g., camera model or imaging sensor model). For example, the machine learning model may be trained to illuminate images captured using the image capture technology in low light. The machine learning model may be trained for an error profile of the image capture technology such that the machine learning model may be optimized to correct errors characteristic of the image capture technology. In some embodiments, the system may be configured to access data obtained from a type of imaging sensor. As an example, the system may access target images captured by a particular model of a CMOS imaging sensor. In some embodiments, the system may be configured to access training images captured by a particular camera model. As described herein, for example, the system may access target images captured by a Canon EOS Rebel T7i EF-S 18-135 camera and/or any other type of camera. Some embodiments are not limited to a particular type of image capture technology described herein.

The imaging device can capture the target and input images of the displayed video frame using various techniques, such as by using different exposure times and/or by capturing the display at different brightness settings. In some embodiments, the imaging device can capture the target and input images using different exposure times. For example, the imaging device can capture the target image using a first exposure time, and can capture the input image of the displayed video frame using a second exposure time that is less than the first exposure time. In some embodiments, the imaging device may capture the target images by using a first exposure time that is long enough to capture images of the displayed video frame with a threshold amount of lighting (e.g., with at least 200 lux). In some embodiments, the imaging device may capture input images, or dark images, with certain low light criteria (e.g., with less than 50 lux).

In some embodiments, the imaging device can capture the target and input images of the displayed video frame using different brightness settings of the display. For example, the imaging device can capture the target image when the display is displaying the video frame at a first brightness, and can capture the input image at a second brightness that is darker than the first brightness. In some embodiments, the brightness of the display can be adjusted such that the imaging device can capture the target and input images using the same exposure time. In some embodiments the exposure time and/or brightness of the display can be adjusted based on how the underlying video was captured (e.g., depending on whether the video data was captured under low light conditions or normal/bright light conditions).

In some embodiments, the brightness of the TV can be profiled to determine brightness values that each reflect an associated lux value with accurate colors. For example, TVs may only have a brightness value that can be adjusted from a predetermined range, such as from 0 to 100, 0 to 50, and/or the like. It could be expected that the lux of the RGB values of the display to essentially increase linearly as the brightness changes from 0 to 100, such that as the brightness is increased, the lux of each color similarly increases in a linear fashion. The inventors have discovered and appreciated, however, that when changing a brightness value on a TV, the RGB values for the various brightness levels may have different profiles and may not linearly change from level to level. Therefore, for some TVs, instead of increasing linearly with the brightness setting, the RGB lux values may increase quickly at some points, and then slowly at other points. For example, for a low brightness setting (e.g., 5, 7, 10, etc.), the display may not be able to (accurately) express certain colors of the TV for that brightness level, such that a dark scene displayed at 0.5 lux may not be the same as the scene in 0.5 lux in real light. As another example, for a high brightness setting (e.g., 60, 70, 80), the display may also not be able to accurately express certain colors.

In some embodiments, a calibration process can be used to determine the brightness levels of the TV to use to capture the various training images. For example, a lux meter can be used to calibrate the brightness levels. In some embodiments, the display device can display a color chart as part of the calibration process to determine whether a particular brightness/lux level outputs accurate RGB values (e.g., RGB values similar to those as if viewing the scene under the same level of lux illumination). The color chart may include, for example, various bars such as red, blue, green, and black (to white) bars that range from 0 to 100. The determined calibration profile can be saved and used to determine the appropriate brightness settings for the TV when capturing various types of images, such as an appropriate brightness setting(s) to capture dark images and appropriate brightness setting(s) to capture bright images.

Figure 8:
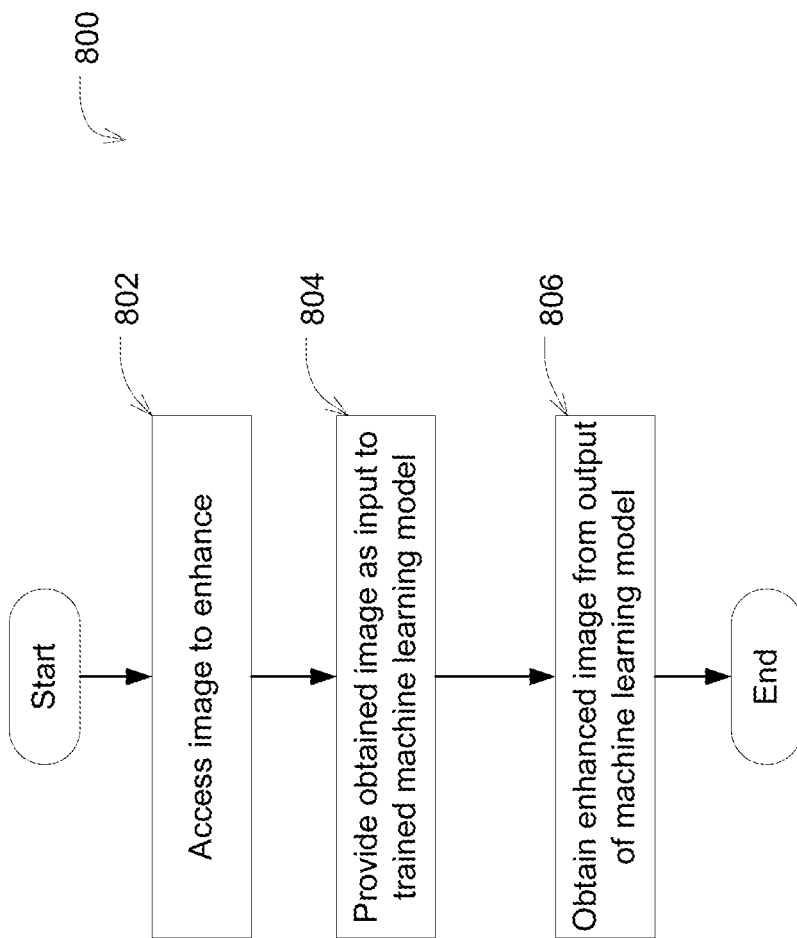
FIG. 8 illustrates an example process for using a trained machine learning model obtained from process of FIG. 7 for enhancing an image, according to some embodiments of the technology described herein.

FIG. 8 illustrates an example process 800 for using a trained machine learning model obtained from process 700 for enhancing an image, according to some embodiments of the technology described herein. Process 800 may be performed by any suitable computing device. As an example, process 800 may be performed by image enhancement system 111 described with reference to FIGS. 1A-B.

Process 800 begins at block 802 where the system accesses an image to enhance. In some embodiments, the system may be configured to access an image captured by an imaging device (e.g., a digital camera or an imaging sensor thereof). For example, the system may access an image captured when the device is used to capture a photo of a scene. As another example, the system may access a frame of a video when the device is used to capture a video. In some embodiments, the system may be configured to access the image before the device applies image processing to the captured image (e.g., as described above with reference to FIG. 1B). In some embodiments, the system may include an application installed on a device (e.g., a smartphone) that accesses images captured by the device (e.g., by a digital camera of the smartphone). The application may access an image before the captured image is displayed to a user.

Next, process 800 proceeds to block 804 where the system provides the image accessed at bock 802 to a trained machine learning model. For example, the system may provide the image accessed at block 802 to a machine learning model trained using process 700 described herein with reference to FIG. 7. In some embodiments, the system may be configured to provide the image as input to the machine learning model by providing image pixel values as input to the machine learning model. For example, the image may be a 1000×1000 pixel image. The system may provide pixel values at each of the pixels as input to the machine learning model. In some embodiments, the system may be configured to flatten an image into a set of pixel values. For example, the system may: (1) flatten a 500×500 pixel image into a 250,000×1 array of pixel values; and (2) provide the array as input to the machine learning model. To illustrate, the machine learning model (e.g., a CNN) may have multiple inputs. The system may be configured to provide pixel values from the image as the multiple inputs.

In some embodiments, the system may be configured to provide an image as input to a machine learning model by: (1) dividing the image into multiple portions; and (2) providing each portion as input to the machine learning model. For example, the system may provide pixel values of each of the portions of the image as input to the machine learning model. The system may input pixel values of a portion of the image as an array to the machine learning model.

In some embodiments, the system may be configured to obtain an enhanced output image corresponding to an input image provided to the machine learning model. In some embodiments, the system may be configured to obtain the enhanced output image by: (1) obtaining multiple pixel values in response to providing pixel values of an image to be enhanced to the machine learning model; and (2) generating the enhanced image from the obtained pixel values. For example, the machine learning model may be CNN, as described herein. In this example, the pixel values may be provided as inputs to a first convolutional layer of the CNN.

After providing the image as input to the machine learning model at block 804, process 800 proceeds to block 806 where the system obtains an enhanced image from the output of the machine learning model. In some embodiments, the system may be configured to obtain, from the machine learning model, pixel values of an enhanced image. For example, the machine learning model may output a 250,000×1 array of pixel values that specify pixel values at pixels of a 500×500 output image. In some embodiments, the system may be configured to: (1) obtain, from the machine learning model, enhanced versions of multiple portions of the input image; and (2) combine the enhanced image portions to generate the enhanced image. An example process for providing image portions as input to a machine learning model, and combining outputs corresponding to the input image portions is described herein with reference to FIGS. 5B-C.

In some embodiments, after the system obtained an enhanced image from the output of the machine learning model, process 800 ends. For example, the system may output the enhanced image. In some embodiments, the system may be configured to store the enhanced image. For example, the system may store the enhanced image on a hard drive of a device (e.g., a smartphone). In some embodiments, the system may be configured to pass the enhanced image for additional image processing. For example, the device may have additional image enhancement processing that is applied to photos that may be applied to the enhanced image obtained from the machine learning model.

In some embodiments, after obtaining an enhanced image from the output of the machine learning model, process 800 returns to block 802 (as indicated by the dashed line from block 806 to block 802) where the system accesses another image to enhance. For example, the system may receive a sequence of video frames from a video being captured or previously captured by an imaging device. The system may be configured perform the steps of blocks 802-806 to each frame of the video. In some embodiments, the system may enhance each video frame in real time such that a user of a device viewing a feed of the video may view the enhanced video frames. If a video is being captured in low light (e.g., outdoors after sunset), the system may enhance each frame of video being captured such that video being viewed on a display of the imaging device is enhanced (e.g., colors are lit up). As another example, the system may perform the steps of blocks 802-806 to a series of photos captured by an imaging device.

Figure 9:
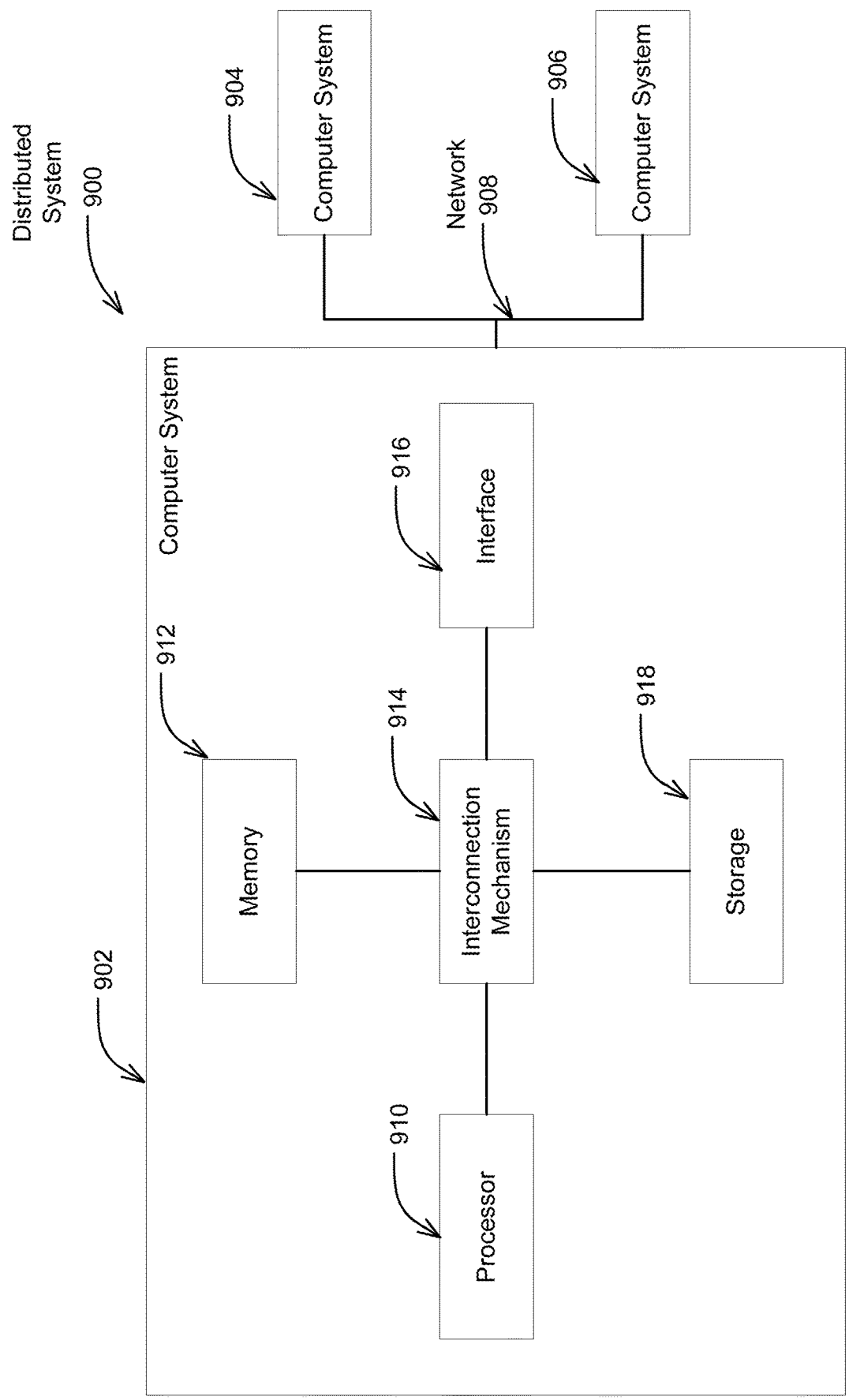
FIG. 9 shows a block diagram of a distributed computer system, in which various aspects may be implemented, according to some embodiments.

FIG. 9 shows a block diagram of a specially configured distributed computer system 900, in which various aspects may be implemented. As shown, the distributed computer system 900 includes one or more computer systems that exchange information. More specifically, the distributed computer system 900 includes computer systems 902, 904, and 906. As shown, the computer systems 902, 904, and 906 are interconnected by, and may exchange data through, a communication network 908. The network 908 may include any communication network through which computer systems may exchange data. To exchange data using the network 908, the computer systems 902, 904, and 906 and the network 908 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MIMS, SS6, JSON, SOAP, CORBA, REST, and Web Services. To ensure data transfer is secure, the computer systems 902, 904, and 906 may transmit data via the network 908 using a variety of security measures including, for example, SSL or VPN technologies. While the distributed computer system 900 illustrates three networked computer systems, the distributed computer system 900 is not so limited and may include any number of computer systems and computing devices, networked using any medium and communication protocol.

As illustrated in FIG. 9, the computer system 902 includes a processor 910, a memory 912, an interconnection element 914, an interface 916 and data storage element 918. To implement at least some of the aspects, functions, and processes disclosed herein, the processor 910 performs a series of instructions that result in manipulated data. The processor 910 may be any type of processor, multiprocessor or controller. Example processors may include a commercially available processor such as an Intel Xeon, Itanium, Core, Celeron, or Pentium processor; an AMD Opteron processor; an Apple A10 or A5 processor; a Sun Ultra-SPARC processor; an IBM Power5+ processor; an IBM mainframe chip; or a quantum computer. The processor 910 is connected to other system components, including one or more memory devices 912, by the interconnection element 914.

The memory 912 stores programs (e.g., sequences of instructions coded to be executable by the processor 910) and data during operation of the computer system 902. Thus, the memory 912 may be a relatively high performance, volatile, random access memory such as a dynamic random access memory ("DRAM") or static memory ("SRAM"). However, the memory 912 may include any device for storing data, such as a disk drive or other nonvolatile storage device. Various examples may organize the memory 912 into particularized and, in some cases, unique structures to perform the functions disclosed herein. These data structures may be sized and organized to store values for particular data and types of data.

Components of the computer system 902 are coupled by an interconnection element such as the interconnection mechanism 914. The interconnection element 914 may include any communication coupling between system components such as one or more physical busses in conformance with specialized or standard computing bus technologies such as IDE, SCSI, PCI and InfiniBand. The interconnection element 914 enables communications, including instructions and data, to be exchanged between system components of the computer system 902.

The computer system 902 also includes one or more interface devices 916 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 902 to exchange information and to communicate with external entities, such as users and other systems.

The data storage element 918 includes a computer readable and writeable nonvolatile, or non-transitory, data storage medium in which instructions are stored that define a program or other object that is executed by the processor 910. The data storage element 918 also may include information that is recorded, on or in, the medium, and that is processed by the processor 910 during execution of the program. More specifically, the information may be stored in one or more data structures specifically configured to conserve storage space or increase data exchange performance. The instructions may be persistently stored as encoded signals, and the instructions may cause the processor 910 to perform any of the functions described herein. The medium may, for example, be optical disk, magnetic disk or flash memory, among others. In operation, the processor 910 or some other controller causes data to be read from the nonvolatile recording medium into another memory, such as the memory 912, that allows for faster access to the information by the processor 910 than does the storage medium included in the data storage element 918. The memory may be located in the data storage element 918 or in the memory 912, however, the processor 910 manipulates the data within the memory, and then copies the data to the storage medium associated with the data storage element 918 after processing is completed. A variety of components may manage data movement between the storage medium and other memory elements and examples are not limited to particular data management components. Further, examples are not limited to a particular memory system or data storage system.

Although the computer system 902 is shown by way of example as one type of computer system upon which various aspects and functions may be practiced, aspects and functions are not limited to being implemented on the computer system 902 as shown in FIG. 9. Various aspects and functions may be practiced on one or more computers having a different architectures or components than that shown in FIG. 9. For instance, the computer system 902 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 902 may be a computer system including an operating system that manages at least a portion of the hardware elements included in the computer system 902. In some examples, a processor or controller, such as the processor 910, executes an operating system. Examples of a particular operating system that may be executed include a Windows-based operating system, such as, Windows NT, Windows 2000 (Windows ME), Windows XP, Windows Vista or Windows 6, 8, or 6 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 910 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture.

It is to be appreciated that embodiments of the methods and apparatuses described herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features described in connection with any one or more embodiments are not intended to be excluded from a similar role in any other embodiments.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for training a machine learning system to enhance images, the system comprising:
   a processor; and a non-transitory computer-readable storage medium storing processor-executable instructions that, when executed by the processor, cause the processor to perform:
    obtaining a set of training images usable for training the machine learning system, the obtaining comprising:
        obtaining an input image of a scene; and
        obtaining a target output image of the scene by averaging a plurality of images of the scene, wherein the plurality of images are associated with a plurality of predetermined rest intervals, between the plurality of images, configured to maintain at least one thermal noise property, associated with the target output image, consistent with one or more noise properties associated with the input image, and wherein the target output image represents a target enhancement of the input image; and
    training the machine learning system using the set of training images.

2. The system of claim 1, wherein the instructions further cause the processor to:
    obtain a set of input images, wherein the input images in the set of the input images are of a corresponding scene;
    obtain a set of second target output images comprising, for the input images in the set of the input images, obtaining a second target output image of the corresponding scene by averaging a second plurality of images of the corresponding scene; and
    train the machine learning system using the set of the input images and the set of the target output images.

3. The system of claim 1, wherein obtaining the input image comprises obtaining the input image at an ISO setting that is above a predetermined ISO threshold.

4. The system of claim 3, wherein the predetermined ISO threshold is selected from an ISO range of approximately 1500 to 500,000.

5. The system of claim 1, wherein averaging the plurality of images comprises computing an arithmetic mean across each pixel location in the plurality of images.

6. The system of claim 1, wherein obtaining the set of training images comprises obtaining a second set of training images for a plurality of image capture settings, and wherein the plurality of predetermined rest intervals configured to maintain the at least one thermal noise property associated with the target output image is consistent with one or more noise properties associated with the input image.

7. The system of claim 1, wherein obtaining the set of training images comprises obtaining one or more images that capture noise of an imaging device used to capture an input set of images and an output set of images.

8. The system of claim 1, wherein the instructions further cause the processor to perform obtaining a second set of training images and retrain the machine learning system using the second set of training images.

9. The system of claim 1, wherein the instructions further cause the processor to:
    obtain the set of training images from a respective imaging device; and
    train the machine learning system based on the set of training images from the respective imaging device to optimize enhancement by the machine learning system for the respective imaging device.

10. The system of claim 1, wherein the machine learning system comprises a neural network.

11. The system of claim 1, wherein training the machine learning system comprises minimizing a linear combination of multiple loss functions.

12. The system of claim 1, wherein training the machine learning system comprises optimizing the machine learning system for performance in a frequency range perceivable by humans.

13. The system of claim 12, wherein training the machine learning system comprises:
    obtaining an enhanced image generated by the machine learning system corresponding to a respective input image;
    obtaining a respective target output image of a set of target output images corresponding to the respective input image;
    passing the enhanced image and the target output image through a bandpass filter to obtain a filtered enhanced image and a filtered output image; and
    training the machine learning system based on the filtered enhanced image and filtered target output image.

14. The system of claim 1, wherein training the machine learning system comprises:
    obtaining a noise image associated with an imaging device used to capture the set of training images, wherein the noise image captures noise generated by the imaging device; and
    including the noise image as an input into the machine learning system.

15. The system of claim 1, wherein obtaining the set of training images usable for training the machine learning system comprises:
    obtaining a set of input images using a neutral density filter, wherein the input images of the set of the input images are of a corresponding scene; and
    obtaining a set of target output images, comprising for the input images in the set of the input images, obtaining a second target output image of the corresponding scene that is captured without the neutral density filter, wherein the second target output image represents a target enhancement of the input image.

16. The system of claim 11, wherein the machine learning system comprises a neural network comprising a convolutional neural network or a densely connected convolutional neural network.

17. The system of claim 1, wherein the predetermined rest intervals are configured to enable an imaging device capturing the plurality of images to control a temperature of the imaging device.

18. The system of claim 17, wherein the instructions further cause the processor to control the temperature by enabling cooling of the imaging device.

19. A method for training a machine learning system to enhance images, the method comprising:
    obtaining a set of training images usable for training the machine learning system, the obtaining comprising:
        obtaining an input image of a scene; and
        obtaining a target output image of the scene by averaging a plurality of images of the scene, wherein the plurality of images are associated with a plurality of predetermined rest intervals, between the plurality of images, configured to maintain at least one thermal noise property associated with the target output image, consistent with one or more noise properties associated with the input image and wherein the target output image represents a target enhancement of the input image; and
    training the machine learning system using the set of training images.

20. The method of claim 19, wherein the predetermined rest intervals are configured to enable an imaging device capturing the plurality of images to control a temperature of the imaging device.

* * * * *